(12) United States Patent
Shock et al.

(10) Patent No.: US 9,676,652 B2
(45) Date of Patent: Jun. 13, 2017

(54) SYSTEMS AND METHODS FOR MAKING FOAMED GLASS USING SUBMERGED COMBUSTION

(71) Applicant: JOHNS MANVILLE, Denver, CO (US)

(72) Inventors: Jeffrey M Shock, Castle Rock, CO (US); Aaron Morgan Huber, Castle Rock, CO (US); Timothy G Swales, Aurora, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 14/607,314

(22) Filed: Jan. 28, 2015

(65) Prior Publication Data

US 2015/0166389 A1  Jun. 18, 2015

Related U.S. Application Data

(62) Division of application No. 13/267,990, filed on Oct. 7, 2011, now Pat. No. 8,997,525.

(51) Int. Cl.
*C03B 19/08* (2006.01)
*C03B 5/235* (2006.01)
*C03B 37/01* (2006.01)

(52) U.S. Cl.
CPC ............ *C03B 19/08* (2013.01); *C03B 5/2356* (2013.01); *C03B 37/01* (2013.01); *C03B 2211/22* (2013.01); *C03B 2211/23* (2013.01)

(58) Field of Classification Search
None
See application file for complete search history.

(56) References Cited

U.S. PATENT DOCUMENTS

| 1,716,433 A | 6/1929 | Ellis |
| 2,174,533 A | 1/1939 | See et al. |

(Continued)

FOREIGN PATENT DOCUMENTS

| DE | 196 19 919 A1 | 8/1997 |
| DE | 100 29 983 C2 | 9/2003 |

(Continued)

OTHER PUBLICATIONS

"Glass Technologies—The Legacy of a Successful Public-Private Partnership", 2007, U.S. Department of Energy, pp. 1-32.

(Continued)

*Primary Examiner* — Cynthia Szewczyk
(74) *Attorney, Agent, or Firm* — Robert D. Touslee

(57) ABSTRACT

Submerged combustion systems and methods of use to produce foamed glass. One system includes a submerged combustion melter having an outlet, the melter configured to produce an initial foamy molten glass having a density and comprising bubbles filled primarily with combustion product gases. The initial foamy molten glass is deposited directly onto or into a transport apparatus that transports the initial foamy molten glass to a downstream processing apparatus. An intermediate stage may be included between the melter and the transport apparatus. One intermediate stage is a channel that includes gas injectors. Another intermediate stage is a channel that produces an upper flow of a less dense glass and a relatively more dense glass lower flow. The upper flow may be processed into foamed glass products, while the more dense flow may be processed into dense glass products.

35 Claims, 7 Drawing Sheets

(56) References Cited

U.S. PATENT DOCUMENTS

| | | |
|---|---|---|
| 2,118,479 A | 1/1940 | McCaskey |
| 2,191,658 A | 2/1940 | Haux |
| 2,233,631 A | 3/1941 | Miller et al. |
| 2,269,459 A | 1/1942 | Kleist |
| 2,354,807 A | 8/1944 | Fox et al. |
| 2,432,942 A | 12/1947 | See et al. |
| 2,455,907 A | 1/1948 | Sayter |
| 2,718,096 A | 9/1955 | Henry at al |
| 2,773,545 A | 12/1956 | Petersen |
| 2,781,756 A | 2/1957 | Kobe |
| 2,878,644 A | 3/1959 | Fenn |
| 2,890,166 A | 6/1959 | Heinze |
| 2,902,029 A | 9/1959 | Hill |
| 2,981,250 A | 4/1961 | Stewart |
| 3,104,947 A | 9/1962 | Switzer et al. |
| 3,073,683 A | 1/1963 | Switzer et al. |
| 3,084,392 A | 4/1963 | Labino |
| 3,088,812 A | 5/1963 | Bitterlich et al. |
| 3,151,966 A | 10/1964 | Games |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,189 A | 11/1965 | Bauer |
| 3,224,855 A | 12/1965 | Plumat |
| 3,237,929 A | 3/1966 | Plumat et al. |
| 3,241,548 A | 3/1966 | See et al. |
| 3,248,205 A | 4/1966 | Dolf et al. |
| 3,260,587 A | 7/1966 | Dolf et al. |
| 3,268,313 A | 8/1966 | Burgman et al. |
| 3,285,834 A | 11/1966 | Guerrieri et al. |
| 3,294,512 A | 12/1966 | Penberthy |
| 3,325,298 A | 6/1967 | Brown |
| 3,402,025 A | 9/1968 | Garrett et al. |
| 3,407,805 A | 10/1968 | Bougard |
| 3,407,862 A | 10/1968 | Mustian, Jr. |
| 3,421,873 A | 1/1969 | Burgman et al. |
| 3,432,399 A | 3/1969 | Schutt |
| 3,498,779 A | 3/1970 | Hathaway |
| 3,510,393 A | 5/1970 | Burgman et al. |
| 3,525,674 A | 8/1970 | Barnebey |
| 3,592,623 A | 7/1971 | Shepherd |
| 3,606,825 A | 9/1971 | Johnson |
| 3,617,234 A | 11/1971 | Hawkins et al. |
| 3,627,504 A | 12/1971 | Johnson et al. |
| 3,692,017 A | 9/1972 | Glachant et al. |
| 3,717,139 A | 2/1973 | Guillet et al. |
| 3,738,792 A | 6/1973 | Feng |
| 3,746,527 A | 7/1973 | Knavish et al. |
| 3,747,588 A | 7/1973 | Malmin |
| 3,763,915 A | 10/1973 | Perry et al. |
| 3,764,287 A | 10/1973 | Brocious |
| 3,771,988 A | 11/1973 | Starr |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,913,560 A | 10/1975 | Lazarre et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,110,098 A | 8/1978 | Mattmuller |
| 4,185,982 A | 1/1980 | Schwenninger |
| 4,203,761 A | 5/1980 | Rose |
| 4,205,966 A | 6/1980 | Horikawa |
| 4,226,564 A | 10/1980 | Takahashi et al. |
| 4,238,226 A | 12/1980 | Sanzenbacher et al. |
| 4,270,740 A | 6/1981 | Sanzenbacher et al. |
| 4,282,023 A | 8/1981 | Hammel et al. |
| 4,303,435 A | 12/1981 | Sleighter |
| 4,323,718 A | 4/1982 | Buhring et al. |
| 4,349,376 A | 9/1982 | Dunn et al. |
| 4,406,683 A | 9/1983 | Demarest |
| 4,488,537 A | 12/1984 | Laurent |
| 4,539,034 A | 9/1985 | Hanneken |
| 4,542,106 A | 9/1985 | Sproull |
| 4,545,800 A | 10/1985 | Won et al. |
| 4,626,199 A | 12/1986 | Bounini |
| 4,632,687 A | 12/1986 | Kunkle et al. |
| 4,634,461 A | 1/1987 | Demarest, Jr. et al. |
| 4,657,586 A | 4/1987 | Masterson et al. |
| 4,735,642 A | 4/1988 | Jensen et al. |
| 4,738,938 A | 4/1988 | Kunkle et al. |
| 4,758,259 A | 7/1988 | Jensen |
| 4,798,616 A | 1/1989 | Knavish et al. |
| 4,816,056 A | 3/1989 | Tsai et al. |
| 4,882,736 A | 11/1989 | Pieper |
| 4,919,700 A | 4/1990 | Pecoraro et al. |
| 4,953,376 A | 9/1990 | Merlone |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,169,424 A | 12/1992 | Grinnen et al. |
| 5,199,866 A | 4/1993 | Joshi et al. |
| 5,204,082 A | 4/1993 | Schendel |
| 5,299,929 A | 4/1994 | Yap |
| 5,360,171 A | 11/1994 | Yap |
| 5,405,082 A | 4/1995 | Brown et al. |
| 5,449,286 A | 9/1995 | Snyder et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,595,703 A | 1/1997 | Swaelens et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |
| 5,718,741 A | 2/1998 | Hull et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,944,864 A | 8/1999 | Hull et al. |
| 5,954,498 A | 9/1999 | Joshi et al. |
| 5,975,886 A | 11/1999 | Phillippe |
| 5,979,191 A | 11/1999 | Jian |
| 5,984,667 A | 11/1999 | Phillippe et al. |
| 5,993,203 A | 11/1999 | Koppang |
| 6,029,910 A | 2/2000 | Joshi et al. |
| 6,039,787 A | 3/2000 | Edlinger |
| 6,045,353 A | 4/2000 | VonDrasek et al. |
| 6,068,468 A | 5/2000 | Phillippe et al. |
| 6,071,116 A | 6/2000 | Phillippe et al. |
| 6,074,197 A | 6/2000 | Phillippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |
| 6,171,100 B1 | 1/2001 | Joshi et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,916 B1 | 6/2001 | Phillippe et al. |
| 6,274,164 B1 | 8/2001 | Novich |
| 6,276,924 B1 | 8/2001 | Joshi et al. |

(56) References Cited

U.S. PATENT DOCUMENTS

| | | |
|---|---|---|
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,338,337 B1 | 1/2002 | Panz et al. |
| 6,344,747 B1 | 2/2002 | Lunghofer et al. |
| 6,357,264 B1 | 3/2002 | Richards |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,651 B2 | 3/2003 | Ezumi et al. |
| 6,558,606 B1 | 5/2003 | Kulkarni et al. |
| 6,660,106 B1 | 12/2003 | Babel et al. |
| 6,694,791 B1 | 2/2004 | Johnson et al. |
| 6,701,617 B2 | 3/2004 | Li et al. |
| 6,705,118 B2 | 3/2004 | Simpson et al. |
| 6,708,527 B1 | 3/2004 | Ibarlucea et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 7,027,467 B2 | 4/2006 | Baev et al. |
| 7,134,300 B2 | 11/2006 | Hayes et al. |
| 7,168,395 B2 | 1/2007 | Engdahl |
| 7,231,788 B2 | 6/2007 | Karetta et al. |
| 7,273,583 B2 | 9/2007 | Rue et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,778,290 B2 | 8/2010 | Sacks et al. |
| 7,832,365 B2 | 11/2010 | Hannum et al. |
| 7,845,314 B2 | 12/2010 | Smith |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0039491 A1 | 2/2005 | Maugendre et al. |
| 2005/0103323 A1 | 5/2005 | Engdahl |
| 2006/0000239 A1 | 1/2006 | Jeanvoine et al. |
| 2006/0174655 A1 | 8/2006 | Kobayashi et al. |
| 2007/0122332 A1 | 5/2007 | Jacques et al. |
| 2007/0212546 A1 | 9/2007 | Jeanvoine et al. |
| 2007/0220922 A1 | 9/2007 | Bauer et al. |
| 2008/0035078 A1 | 2/2008 | Li |
| 2008/0256981 A1 | 10/2008 | Jacques et al. |
| 2008/0276652 A1 | 11/2008 | Bauer et al. |
| 2009/0042709 A1 | 2/2009 | Jeanvoine et al. |
| 2009/0220899 A1 | 9/2009 | Spangelo et al. |
| 2010/0064732 A1 | 3/2010 | Jeanvoine et al. |
| 2010/0089383 A1 | 4/2010 | Cowles |
| 2010/0143601 A1 | 6/2010 | Hawtof et al. |
| 2010/0162772 A1 | 7/2010 | McGinnis et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0326137 A1 | 12/2010 | Rouchy et al. |
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1 | 9/2011 | Rue et al. |

FOREIGN PATENT DOCUMENTS

| | | |
|---|---|---|
| DE | 10 2005 033330 B3 | 8/2006 |
| EP | 0 181 248 B1 | 10/1989 |
| EP | 1 337 789 B1 | 12/2004 |
| EP | 2 133 315 A1 | 12/2009 |
| EP | 1 986 966 B1 | 4/2010 |
| EP | 1 667 934 B1 | 2/2011 |
| FR | 2 740 860 A1 | 9/1997 |
| GB | 191301772 | 1/1914 |
| GB | 191407633 | 3/1914 |
| GB | 164073 | 5/1921 |
| IT | 1208172 | 7/1989 |
| RO | 114827 | 7/1999 |
| WO | 98/55411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |

OTHER PUBLICATIONS

"Glass Melting Technology—A Technical and Economic Assessment," 2004, U.S. Department of Energy, pp. 1-292.

Rue, "Energy-Efficient Glass Melting—The Next Generation Meiter", Gas Technology Institute, Project No. 20621 Final Report (2008).

"Glass Industry of the Future", United States Department of Energy, report 02-GA50113-03, pp. 1-17, Sep. 30, 2008.

Olabin, V.M. et A L, "Submerged Combustion Furnace for Glass Melts," Ceramic Engineering and Science Proceedings, Jan. 1, 1996, pp. 84-92, vol. 17—No. 2, American Ceramic Society Inc., US.

SYSTEMS AND METHODS FOR MAKING FOAMED GLASS USING SUBMERGED COMBUSTION

CROSS-REFERENCE TO RELATED APPLICATIONS

This application is a division of prior U.S. application Ser. No. 13/267,990 filed Oct. 7, 2011, now issued U.S. Pat. No. 8,997,525 issued Apr. 7, 2015. This application is related to assignee's U.S. non-provisional U.S. application Ser. Nos. 12/817,754 filed Jun. 17, 2010, now issued U.S. Pat. No. 8,769,992 issued Jul. 8, 2014; Ser. No. 12/888,970 filed Sep. 23, 2010, now issued U.S. Pat. No. 8,650,914 issued Feb. 18, 2014; and Ser. No. 13/268,028 filed Oct. 7, 2011, now issued U.S. Pat. No. 8,875,544 issued Nov. 4, 2014, all of which are incorporated herein by reference.

BACKGROUND INFORMATION

Technical Field

The present disclosure relates generally to the field of combustion furnaces and methods of use to produce glass, and more specifically to methods and apparatus for making foamed glass using submerged combustion melters.

Background Art

High temperature foamed glass production currently utilizes conventional glass melting technologies and knowledge of control of sulfur gas compounds solubility in molten glass to produce glass with a large volume fraction of bubbles to give the glass objects thermal insulating properties. However, these glass products may suffer from offensive odors and may not have adequate high temperature properties.

Submerged combustion melting (SCM) involves melting glass batch materials to produce molten glass by passing oxygen, oxygen-air mixtures or air along with a fuel, typically liquid and/or gaseous fuel, into the glass batch, directly into a molten pool of glass usually through burners submerged in a glass melt pool. Part or all of the fuel can be solid organic fuel or waste, including ground fiber reinforced composite material, paper, wood, and the like. The introduction of high flow rates of oxidant and fuel into the molten glass, and the expansion of the gases cause rapid melting of the glass batch and much turbulence. However, one drawback to submerged combustion is the tendency of the molten glass to foam. Many methods of removing this foam, and the many bubbles of many sizes making up the foam, to make the molten glass usable in conventional glass forming processes have been proposed and many patent applications have been filed on these concepts and inventions. Many patents have issued.

For several years those involved in SCM technology, as evidenced by published patent applications and issued patents, have concentrated on ways of more quickly refining the foamy SCM molten glass. It would be an advance in the glass manufacturing art if foamed glass could be manufactured using a submerged combustion melter and methods. It would further be an advance in the art if foamed glass products and non-foamed glass products could be manufactured from the same molten batch from a submerged combustion melter.

SUMMARY

In accordance with the present disclosure, submerged combustion systems and methods are described for making foamed glass articles, and in certain embodiments, both foamed and non-foamed glass articles.

A first aspect of the disclosure is a submerged combustion system comprising:

a submerged combustion melter comprising an outlet, the melter configured to produce an initial foamy molten glass having a density and comprising bubbles filled primarily with combustion product gases, the melter outlet configured to deliver the initial foamy molten glass directly into or onto a transport apparatus without refining, the transport apparatus configured to move the initial foamy molten glass to a processing apparatus. Certain embodiments may include a cooling and annealing lehr downstream of the melter outlet and upstream of the processing apparatus, the lehr having an inlet and an outlet.

A second aspect of the disclosure is a foamed glass manufacturing system comprising:

a submerged combustion melter comprising an outlet, the melter configured to produce an initial foamy molten glass having a density and comprising bubbles filled primarily with combustion product gases, the melter outlet configured to deliver the initial foamy molten glass directly into or onto a transport apparatus without refining, the transport apparatus configured to move the initial foamy molten glass to a processing apparatus, the transport apparatus configured to accept the initial foamy molten glass in it or on it to form a continuous ribbon of molten foamed glass having varying thickness and varying width.

A third aspect of the disclosure is a foamed glass manufacturing system comprising:

a submerged combustion melter comprising an outlet, the melter configured to produce an initial foamy molten glass having a density and comprising bubbles filled primarily with combustion product gases, a refractory or refractory-lined channel configured to receive the initial foamy molten glass from the melter outlet and allow the initial foamy molten glass to traverse through it to a transport apparatus, the channel comprising one or more gas injectors for injecting a gas into the initial foamy molten glass to form a foamy glass comprising generally decreasing density as measured from the melter outlet to an inlet of the transport apparatus, and the transport apparatus configured to accept the foamy molten glass of generally decreasing density in it or on it to form a continuous ribbon of molten foamed glass having varying thickness and varying width and move it to a processing apparatus, optionally through a lehr upstream of the processing equipment.

A fourth aspect of the disclosure is a foamed glass manufacturing system comprising:

a submerged combustion melter comprising an outlet, the melter configured to produce an initial foamy molten glass having a density and comprising bubbles filled primarily with combustion product gases, a refractory or refractory-lined channel having an inlet and an outlet, the inlet configured to receive the initial foamy molten glass from the melter outlet and allows the initial foamy molten glass to traverse through the channel, the channel configured having a width and a depth for forming a zonal flow comprising a generally less dense upper flow of molten glass having generally decreasing density measured from the melter outlet to a downstream transport apparatus, and a generally denser lower flow of molten glass having generally increasing density measured from the melter outlet to a downstream dense glass processing apparatus, the densities compared to the density of the initial foamy glass, the downstream transport apparatus configured to accept the foamy molten glass of generally decreasing density in it or on it to form a continuous ribbon of foamed molten glass having varying thickness and varying width, and the downstream dense glass processing apparatus configured to accept the denser molten glass and form one or more dense glass products.

A fifth aspect of the disclosure is a method comprising:

melting glass-forming materials in a submerged combustion melter comprising an outlet, the melter producing an initial foamy molten glass having a density and comprising bubbles filled primarily with combustion product gases, depositing the initial foamy molten glass from the melter outlet directly onto or into a transport apparatus, and transporting the initial foamy molten glass to a processing apparatus using the transport apparatus.

A sixth aspect of the disclosure is a method of manufacturing foamed glass comprising:

melting glass-forming materials in a submerged combustion melter comprising an outlet, the melter producing an initial foamy molten glass having a density and comprising bubbles filled primarily with combustion product gases, depositing the initial foamy molten glass from the melter outlet directly onto or into a transport apparatus, and transporting the initial foamy molten glass to a processing apparatus using the transport apparatus, forming a continuous ribbon of molten foamed glass on or in the transport apparatus having varying thickness and varying width.

A seventh aspect of the disclosure is a foamed glass manufacturing method comprising:

melting glass-forming materials in a submerged combustion melter comprising an outlet, the melter producing an initial foamy molten glass having a density and comprising bubbles filled primarily with combustion product gases, discharging the initial foamy molten glass from the melter outlet into a refractory or refractory-lined channel and allowing the initial foamy molten glass to traverse through the channel, injecting a gas, through one or more gas injectors extending through a structural element of the channel, into the initial foamy molten glass in the channel, forming a foamy glass in the channel comprising generally decreasing density as measured from the melter outlet, and transporting the foamy glass to a processing apparatus using a transport apparatus.

An eighth aspect of the disclosure is a foamed glass manufacturing method comprising:

melting glass-forming materials in a submerged combustion melter comprising an outlet, the melter producing an initial foamy molten glass having a density and comprising bubbles filled primarily with combustion product gases, discharging the initial foamy molten glass from the melter outlet into a refractory or refractory-lined channel and allowing the initial foamy molten glass to traverse through the channel, the channel having a width and a depth forming a zonal flow comprising a generally less dense upper flow of molten glass having generally decreasing density measured from the melter outlet to a downstream transport apparatus, and a generally denser lower flow of molten glass having generally increasing density measured from the melter outlet to one or more downstream dense glass processing apparatus, the densities compared to the density of the initial foamy glass, depositing the upper flow of molten glass onto or into the downstream transport apparatus, and allowing the generally denser lower flow of molten glass to flow out of the channel to the downstream dense glass processing apparatus.

Systems and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

It is to be noted, however, that the appended drawings are not to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed systems and methods. However, it will be understood by those skilled in the art that the systems and methods covered by the claims may be practiced without these details and that numerous variations or modifications from the specifically described embodiments may be possible and are deemed within the claims. All U.S. published patent applications and US Patents referenced herein are hereby explicitly incorporated herein by reference. In the event definitions of terms in the referenced patents and applications conflict with how those terms are defined in the present application, the definitions for those terms that are provided in the present application shall be deemed controlling.

As explained briefly in the Background, current production of high temperature foam glass products utilizes conventional (non-submerged combustion or electric) glass melting technologies and knowledge of control of sulfur gas compounds' solubility in glass to produce glass with a large volume fraction of bubbles to give the glass objects thermal insulating properties. In contrast, the large void fraction (25 percent, 30 percent, 60 percent, or higher) glass produced within the SCM melting process is produced by the process itself, and not by creating high void fraction by causing bubble formation through decreasing sulfur solubility in the glass as in conventional methods. It was discovered that superior foam glass products could be produced using variations of SCM systems and methods.

Applicants have discovered that the foamed glass products produced by systems and methods of the present disclosure may be superior to conventional foamed glass products. Systems and methods of the present disclosure employing SCM technology may be able to produce glass compositions with higher temperature limitations than the current foamed insulating glass. Systems and methods of the present disclosure employing SCM technology may also be able to produce glass compositions and glass products that do not have offensive odors. The reduced sulfur compounds contained within conventional foamed glass products have offensive odors; whereas, the bubbles produced from the SCM technology do not contain offensive odors.

Figure 1:
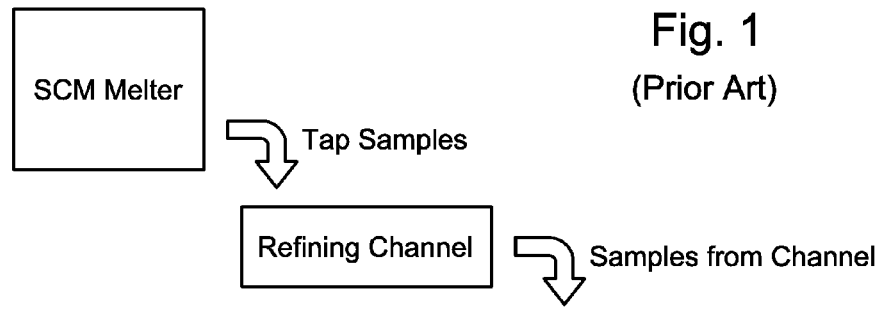
FIG. 1 is a schematic side elevation view of a prior art SCM and refiner.
Figure 2:
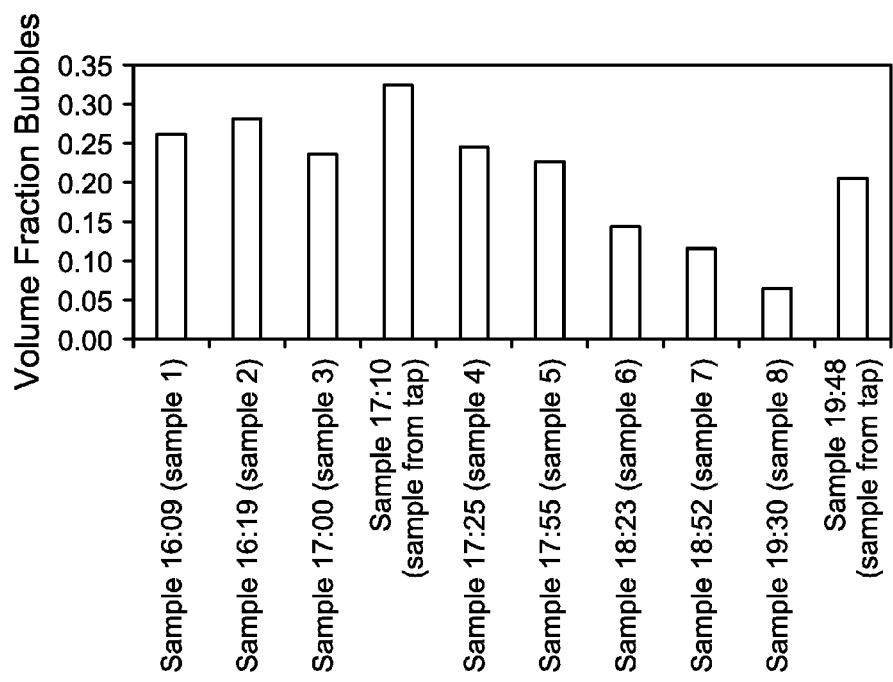
FIG. 2 is a bar graph depicting density of molten glass samples pulled from an SCM of configured substantially as in FIG. 1.
Figure 3:
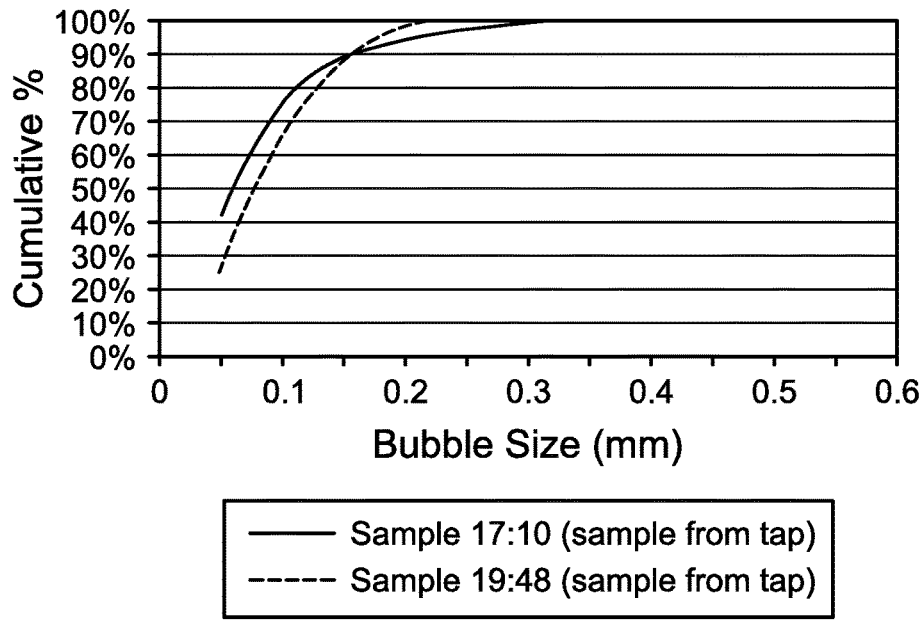
FIGS. 3-5 are graphs of cumulative percentage of bubbles in the samples from FIG. 2 having bubble size as indicated on the X-axis.
Figure 4:
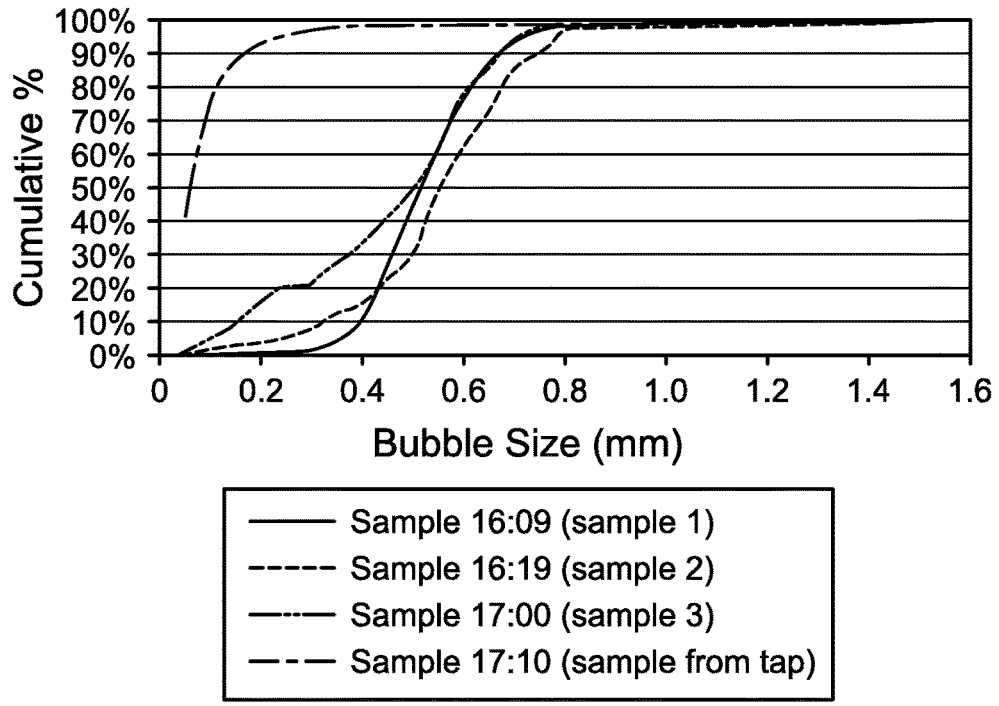
Figure 5:
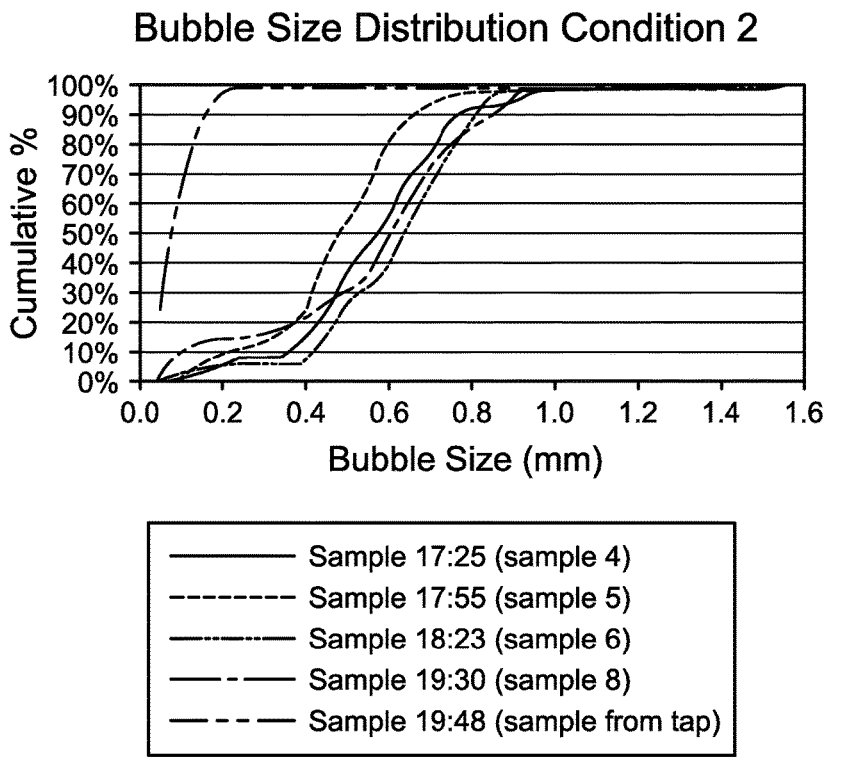

Submerged combustion melters useful in systems and methods of the present disclosure may produce glass that is about 25 percent, or about 30 percent, or more, void fraction as measured during trials. FIG. 1 illustrates schematically a prior art SCM melter and refiner used to conduct these trials. Batch comprising sand, clay, limestone, burnt dolomitic lime, borax and boric acid was melted in the submerged combustion melter. The melter was a rectangular shaped melter about 3.5 ft. wide and 5 ft. long (about 107 cm wide and about 152 cm long) having six oxy-fuel, floor mounted burners. The burners used were as described in U.S. Pat. No. 7,273,583. The fuel was natural gas, fed at a rate of 200 to 1200 scf/min (about 5.66 $m^3$/min to about 34 $m^3$/min) to each burner depending on the throughput, and the oxidant used was oxygen purified from air having a mole percent oxygen greater than 95 percent. Data representing density and volume fraction bubbles in the melt taken at various times and from two different sample locations (Tap Samples and Samples from Channel) obtained from the melter/refiner illustrated schematically in FIG. 1 is graphically illustrated in FIG. 2, using data presented in Table 1. As may be seen from the data in Table 1 and FIG. 2, the volume fraction of bubbles in molten glass taken from the SCM Tap is significantly higher than the volume fraction of bubbles in samples taken from the Channel. As may further be seen from the data in Table 2A and B and FIGS. 3-5, the typical bubble (void) diameter in Tap samples is about 0.1 mm, but with time at temperatures, as is provided by a refractory lined channel, the small bubbles coalesce and form larger voids that rise in the flowing channel and are removed from the bulk glass. With enough time and temperature, the glass becomes "fined" to the state of a solid glass without voids. Insulating foam glass depends on a significant void fraction to produce a closed cell, light-weight glass that has insulating properties. The inventors herein realized that the glass produced from the SCM has a significant closed cell void fraction that could be used as an insulating glass panel. It was, however, realized that some modifications would be needed to control void fraction to a higher fraction (percentage) and to increase the average size of the voids from the typical 0.1 mm diameter to 1 mm or more. Further samples have been produced having void fractions above 60 percent.

TABLE 1

SCM seed volume fraction

| Time (Sample ID) | ID | 1 air | 1 water | 2 air | 2 water | 3 air | 3 water | den 1 | den 2 | den 3 | avg den | STD DEV | Vol Fraction Bubbles |
|---|---|---|---|---|---|---|---|---|---|---|---|---|---|
| Sample 16:09 (sample 1) | 1 | 17.35 | 8.46 | 13.71 | 6.64 | 8.46 | 4.13 | 1.946 | 1.933 | 1.948 | 1.942 | 0.008 | 0.263 |
| Sample 16:19 (sample 2) | 2 | 30.13 | 14.42 | 35.67 | 16.98 | 27.97 | 13.09 | 1.912 | 1.903 | 1.874 | 1.896 | 0.020 | 0.281 |
| Sample 17:00 (sample 3) | 3 | 25.72 | 12.89 | 19.17 | 9.97 | 12.61 | 6.26 | 1.999 | 2.077 | 1.980 | 2.019 | 0.052 | 0.234 |
| Sample 17:10 (sample from tap) | TAP-1 | 9.95 | 4.39 | 7.98 | 3.51 | | | 1.784 | 1.780 | | 1.782 | 0.003 | 0.324 |
| Sample 17:25 (sample 4) | 4 | 43.02 | 21.01 | 19.64 | 9.70 | 8.37 | 4.30 | 1.949 | 1.970 | 2.050 | 1.990 | 0.054 | 0.245 |
| Sample 17:55 (sample 5) | 5 | 23.32 | 12.25 | 17.37 | 8.89 | 23.42 | 11.64 | 2.100 | 2.042 | 1.982 | 2.041 | 0.059 | 0.226 |
| Sample 18:23 (sample 6) | 6 | 40.58 | 22.56 | 29.51 | 16.31 | 8.05 | 4.56 | 2.245 | 2.229 | 2.299 | 2.258 | 0.037 | 0.144 |
| Sample 18:52 (sample 7) | 7 | 26.42 | 15.36 | 63.88 | 36.03 | | | 2.381 | 2.287 | | 2.334 | 0.067 | 0.115 |
| Sample 19:30 (sample 8) | 8 | 25.43 | 15.10 | 10.21 | 6.09 | 7.22 | 4.29 | 2.454 | 2.470 | 2.456 | 2.460 | 0.009 | 0.067 |
| Sample 19:48 (sample from tap) second time: | TAP | 19.91 | 10.47 | 14.30 | 7.46 | | | 2.103 | 2.084 | | 2.093 | 0.013 | 0.206 |
| Sample 17:10) (sample from tap) | TAP-1 | 9.94 | 4.36 | 7.98 | 3.48 | | | 1.776 | 1.768 | | 1.772 | 0.006 | 0.328 |
| Sample 19:48 (sample from tap) | TAP | 19.9 | 10.43 | 14.30 | 7.43 | | | 2.095 | 2.075 | | 2.085 | 0.014 | 0.209 |

TABLE 2

Bubble Diameter Measurements

| Bin (mm) | Sample 16:09 (sample 1) | | Sample 16:19 (sample 2) | | Sample 17:00 (sample 3) | | Sample 17:10 (sample from tap) | | Sample 17:25 (sample 4) | |
|---|---|---|---|---|---|---|---|---|---|---|
| | Frequency | Cum % | Frequency | Cum % | Frequency | Cum % | Frequency | Cum % | Frequency | Cum % |
| 0.05 | 0 | 0% | 0 | 0% | 1 | 1% | 42 | 42% | 0 | 0% |
| 0.1 | 0 | 0% | 1 | 1% | 4 | 5% | 33 | 75% | 1 | 1% |
| 0.15 | 0 | 0% | 2 | 3% | 4 | 9% | 14 | 89% | 2 | 3% |
| 0.2 | 1 | 1% | 0 | 3% | 7 | 16% | 4 | 93% | 2 | 5% |
| 0.25 | 0 | 1% | 2 | 5% | 4 | 20% | 3 | 96% | 3 | 8% |
| 0.3 | 0 | 1% | 2 | 7% | 1 | 21% | 2 | 98% | 0 | 8% |
| 0.35 | 4 | 5% | 6 | 13% | 7 | 28% | 0 | 98% | 1 | 9% |
| 0.4 | 5 | 10% | 2 | 15% | 5 | 33% | 0 | 98% | 5 | 15% |
| 0.45 | 17 | 27% | 7 | 22% | 8 | 41% | 1 | 99% | 8 | 23% |
| 0.5 | 16 | 43% | 8 | 30% | 8 | 49% | 0 | 99% | 13 | 36% |
| 0.55 | 17 | 60% | 18 | 48% | 12 | 61% | 0 | 99% | 10 | 46% |
| 0.6 | 19 | 79% | 14 | 62% | 18 | 79% | 0 | 99% | 11 | 57% |
| 0.65 | 7 | 88% | 11 | 73% | 7 | 86% | 0 | 99% | 12 | 69% |
| 0.7 | 9 | 95% | 12 | 85% | 9 | 95% | 0 | 99% | 8 | 77% |
| 0.75 | 4 | 99% | 5 | 90% | 3 | 96% | 0 | 99% | 12 | 89% |
| 0.8 | 1 | 100% | 7 | 97% | 1 | 99% | 1 | 100% | 3 | 92% |
| 0.85 | 0 | 100% | 0 | 97% | 1 | 100% | 0 | 100% | 1 | 93% |
| 0.9 | 0 | 100% | 1 | 98% | 0 | 100% | 0 | 100% | 1 | 94% |
| 0.95 | 0 | 100% | 0 | 98% | 0 | 100% | 0 | 100% | 4 | 98% |

TABLE 2-continued

Bubble Diameter Measurements

| Bin (mm) | Freq | Cum % | Freq | Cum % | Freq | Cum % | Freq | Cum % | Freq | Cum % |
|---|---|---|---|---|---|---|---|---|---|---|
| 1 | 0 | 100% | 0 | 98% | 0 | 100% | 0 | 100% | 0 | 98% |
| 1.05 | 0 | 100% | 2 | 100% | 0 | 100% | 0 | 100% | 0 | 98% |
| 1.1 | 0 | 100% | 0 | 100% | 0 | 100% | 0 | 100% | 1 | 99% |
| 1.15 | 0 | 100% | 0 | 100% | 0 | 100% | 0 | 100% | 0 | 99% |
| 1.2 | 0 | 100% | 0 | 100% | 0 | 100% | 0 | 100% | 0 | 99% |
| 1.25 | 0 | 100% | 0 | 100% | 0 | 100% | 0 | 100% | 0 | 99% |
| 1.3 | | | 0 | 100% | 0 | 100% | 0 | 100% | 0 | 99% |
| 1.35 | | | 0 | 100% | 0 | 100% | 0 | 100% | 0 | 99% |
| 1.4 | | | 0 | 100% | 0 | 100% | 0 | 100% | 0 | 99% |
| 1.45 | | | 0 | 100% | 0 | 100% | 0 | 100% | 0 | 99% |
| 1.5 | | | 0 | 100% | 0 | 100% | 0 | 100% | 0 | 99% |
| 1.55 | | | 0 | 100% | 0 | 100% | 0 | 100% | 1 | 100% |

| Bin (mm) | Sample 17:55 (sample 5) | | Sample 18:23 (sample 6) | | Sample 18:52 (sample 7) | | Sample 19:30 (sample 8) | | Sample 19:46 (sample from tap) | |
|---|---|---|---|---|---|---|---|---|---|---|
| | Frequency | Cum % | Frequency | Cum % | Frequency | Cum % | Frequency | Cum % | Frequency | Cum % |
| 0.05 | 1 | 1% | 0 | 0% | 0 | 0% | 4 | 4% | 25 | 25% |
| 0.1 | 2 | 3% | 3 | 3% | 2 | 2% | 7 | 11% | 40 | 65% |
| 0.15 | 3 | 6% | 1 | 4% | 3 | 5% | 3 | 14% | 22 | 87% |
| 0.2 | 3 | 9% | 1 | 5% | 0 | 5% | 0 | 14% | 11 | 99% |
| 0.25 | 3 | 12% | 0 | 5% | 3 | 8% | 2 | 16% | 2 | 100% |
| 0.3 | 1 | 13% | 1 | 6% | 2 | 10% | 1 | 17% | 0 | 100% |
| 0.35 | 4 | 17% | 0 | 6% | 0 | 10% | 3 | 20% | 0 | 100% |
| 0.4 | 7 | 24% | 1 | 7% | 8 | 18% | 2 | 22% | 0 | 100% |
| 0.45 | 18 | 43% | 8 | 15% | 6 | 24% | 5 | 27% | 0 | 100% |
| 0.5 | 11 | 54% | 11 | 26% | 4 | 28% | 4 | 31% | 0 | 100% |
| 0.55 | 12 | 66% | 6 | 32% | 9 | 37% | 5 | 36% | 0 | 100% |
| 0.6 | 15 | 81% | 8 | 40% | 15 | 52% | 14 | 50% | 0 | 100% |
| 0.65 | 9 | 90% | 15 | 55% | 14 | 66% | 9 | 59% | 0 | 100% |
| 0.7 | 4 | 94% | 11 | 66% | 9 | 75% | 13 | 72% | 0 | 100% |
| 0.75 | 2 | 96% | 10 | 76% | 8 | 81% | 7 | 79% | 0 | 100% |
| 0.8 | 3 | 99% | 12 | 88% | 9 | 90% | 8 | 87% | 0 | 100% |
| 0.85 | 0 | 99% | 9 | 97% | 5 | 95% | 3 | 90% | 0 | 100% |
| 0.9 | 0 | 99% | 1 | 98% | 2 | 97% | 6 | 98% | 0 | 100% |
| 0.95 | 0 | 99% | 1 | 99% | 2 | 99% | 2 | 98% | 0 | 100% |
| 1 | 0 | 99% | 0 | 99% | 1 | 100% | 1 | 99% | 0 | 100% |
| 1.05 | 0 | 99% | 0 | 99% | 0 | 100% | 0 | 99% | 0 | 100% |
| 1.1 | 0 | 99% | 0 | 99% | 0 | 100% | 0 | 99% | 0 | 100% |
| 1.15 | 1 | 100% | 1 | 100% | 0 | 100% | 1 | 100% | 0 | 100% |
| 1.2 | 0 | 100% | 0 | 100% | 0 | 100% | 0 | 100% | 0 | 100% |
| 1.25 | 0 | 100% | 0 | 100% | 0 | 100% | 0 | 100% | 0 | 100% |
| 1.3 | 0 | 100% | | | 0 | 100% | 0 | 100% | 0 | 100% |
| 1.35 | 0 | 100% | | | 0 | 100% | 0 | 100% | 0 | 100% |
| 1.4 | 0 | 100% | | | 0 | 100% | 0 | 100% | 0 | 100% |
| 1.45 | 0 | 100% | | | 0 | 100% | 0 | 100% | 0 | 100% |
| 1.5 | 0 | 100% | | | 0 | 100% | 0 | 100% | 0 | 100% |
| 1.55 | 0 | 100% | | | 0 | 100% | 0 | 100% | 0 | 100% |

Various terms are used throughout this disclosure. "Submerged" as used herein means that combustion gases emanate from burners under the level of the molten glass; the burners may be floor-mounted, wall-mounted, or in melter embodiments comprising more than one submerged combustion burner, any combination thereof (for example, two floor mounted burners and one wall mounted burner). As used herein the term "combustion gases" means substantially gaseous mixtures of combusted fuel, any excess oxidant, and combustion products, such as oxides of carbon (such as carbon monoxide, carbon dioxide), oxides of nitrogen, oxides of sulfur, and water. Combustion products may include liquids and solids, for example soot and unburned liquid fuels. "Oxidant" as used herein includes air and gases having the same molar concentration of oxygen as air, oxygen-enriched air (air having oxygen concentration of oxygen greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen. Oxidants may be supplied from a pipeline, cylinders, storage facility, cryogenic air separation unit, membrane permeation separator, or adsorption unit.

One aspect of the disclosure is a submerged combustion system comprising a submerged combustion melter comprising an outlet, the melter configured to produce an initial foamy molten glass having a density and comprising bubbles filled primarily with combustion product gases, the melter outlet configured to deliver the initial foamy molten glass directly into or onto a transport apparatus without refining, the transport apparatus configured to move the initial foamy molten glass to a processing apparatus. Certain embodiments may include a cooling and annealing lehr downstream of the melter outlet and upstream of the processing apparatus, the lehr having an inlet and an outlet.

In certain systems of the present disclosure the transport apparatus may be configured to accept the initial foamy molten glass in it or on it to form a continuous ribbon of foamed molten glass having varying thickness and varying width.

In certain systems, the transport apparatus may be configured to allow the continuous ribbon of foamed molten glass thickness to generally decrease as it is being transported by the transport apparatus. In certain systems, the transport apparatus may be configured to allow the continuous ribbon of foamed molten glass width to generally increase as it is being transported by the transport apparatus. In certain other embodiments, the transport apparatus may be configured to allow the continuous ribbon of foamed molten glass width to generally increase, and to allow the thickness to generally decrease as it is being transported by the transport apparatus.

Certain system embodiments may comprise a stage intermediate the melter outlet and the transport apparatus. In certain of these embodiments, the intermediate stage may be configured to receive the initial foamy molten glass directly from the melter outlet. In certain embodiments the intermediate stage may be configured to allow the initial foamy molten glass to traverse through the intermediate stage and change, while traversing through the intermediate stage, into an initial product composition at the inlet to a downstream apparatus that comprises less uniformly distributed bubbles than the initial foamy molten glass.

In certain systems the intermediate stage may comprise a refractory lined channel configured to receive the initial foamy molten glass from the melter outlet and allow at least a portion of the initial foamy molten glass to traverse through to a downstream transport apparatus.

In certain system embodiments, the refractory lined channel may comprise one or more gas injectors for injecting a gas into the initial foamy molten glass to form a foamy glass comprising generally decreasing density as measured from the melter outlet to the downstream transport apparatus.

In certain systems, at least one of the gas injectors may be position to deliver gas through a bottom of the refractory lined channel.

In certain systems, the refractory lined channel may be configured having a width and a depth for forming a zonal flow comprising a generally less dense upper flow of molten glass having generally decreasing density measured from the melter outlet to a downstream transport apparatus, and a generally denser lower flow of molten glass having generally increasing density measured from the melter outlet to an inlet of a downstream dense glass processing apparatus, the densities compared to the density of the initial foamy glass.

Certain system embodiments may comprise a weir over which the generally less dense upper flow of molten glass may flow over. In certain embodiments the weir may be positioned just upstream of the downstream transport apparatus, and an intermediate stage outlet may be positioned and configured to allow the generally denser lower flow of molten glass to exit the refractory lined channel and flow into a downstream dense glass processing apparatus.

Certain system embodiments may be configured to produce the continuous ribbon of foamed molten glass so that its thickness generally decreases away from the melter outlet, and the continuous ribbon width generally increases away from the melter outlet.

Another aspect of this disclosure are methods comprising melting glass-forming materials in a submerged combustion melter comprising an outlet, the melter producing an initial foamy molten glass having a density and comprising bubbles filled primarily with combustion product gases, depositing the initial foamy molten glass from the melter outlet directly onto or into a transport apparatus, and transporting the initial foamy molten glass to a processing apparatus using the transport apparatus.

In certain method embodiments, the melting step may comprise discharging the initial foamy molten glass onto a conveyor, and the transporting step may comprise transporting the initial foamy molten glass using the conveyer to the processing apparatus. Certain method embodiments may comprise the conveyor transporting the glass through a lehr at a controlled speed, the lehr divided into different areas each with its own heat source, and regulating a temperature gradient to which the glass is submitted in the lehr.

In certain methods, the conveyor may accept the initial foamy molten glass on it, forming a continuous ribbon having varying thickness and/or varying width as the ribbon moves on the conveyor. In certain methods the conveyor may allow the continuous ribbon thickness to generally decrease as it travels on the conveyor. In certain methods the conveyor may allow the continuous ribbon width to generally increase as it travels on the conveyor.

Certain methods may comprise discharging the initial foamy molten glass into a stage intermediate the melter outlet and the transport apparatus. In certain methods, the intermediate stage may receive the initial foamy molten glass directly from the melter outlet, and certain methods may comprise transforming the initial foamy molten glass into an initial product composition at the transport apparatus that comprises less uniformly distributed bubbles than the initial foamy molten glass.

Certain methods may comprise discharging the initial foamy molten glass into a refractory or refractory-lined channel, the channel receiving the initial foamy molten glass from the melter outlet and allowing the initial foamy molten glass to traverse through the channel. Certain methods may comprise injecting a gas, through one or more gas injectors extending through a structural element of the channel, into the initial foamy molten glass in the channel, forming a foamy glass in the channel comprising generally decreasing density as measured away from the melter outlet. In certain methods the structural element of the channel may comprise a bottom of the channel. In certain methods the structural element of the channel may comprise a side wall of the channel. In certain methods the structural element of the channel may be both a bottom and one or more side walls of the channel.

In certain methods the discharging of the initial foam molten glass into the refractory or refractory-lined channel may comprise forming a zonal flow comprising a generally less dense upper flow of molten glass having generally decreasing density measured away from the melter outlet, and a generally denser lower flow of molten glass having generally increasing density measured away from the melter outlet, the densities compared to the density of the initial foamy glass.

In certain methods the generally less dense upper flow of molten glass may flow over a weir, the weir positioned just upstream of a transport apparatus. Certain methods may comprise flowing the generally denser lower flow of molten glass out of the channel through an outlet to one or more downstream dense glass processing apparatus.

Certain methods may comprise transporting the foamy glass to a foamed glass product fabricating facility. Certain method embodiments may comprise using the foamed glass product fabricating facility to produce a foamed glass product having reduced odor compared to a foamed glass product made using a non-submerged combustion batch melting process.

Certain methods may comprise transporting the denser flow of molten glass to a production apparatus for manufacturing dense glass products, the production apparatus selected from the group consisting of continuous fiber production apparatus, discontinuous fiber production apparatus, and glass shaping apparatus.

Certain systems and methods may comprise at least one burner directing combustion products into a melting zone under a level of molten glass in the zone. In certain systems and methods at least some heat used for the melting may come from heat from combustion of at least some of the binder of glass mat and/or roving fed to the melter. In certain systems and methods the submerged combustion melter may be operated at a pressure less than atmospheric pressure. These systems and methods may ensure that any combustion products generated during melting remain in the system and do not escape through the feed slot.

Certain system and method embodiments of this disclosure may include submerged combustion melters comprising fluid-cooled panels, wherein a feed slot may be covered and integral with a fluid-cooled panel of a wall of the melter. In certain other embodiments, the slot may be integral with an exhaust port or roof of the melter. In certain embodiments, the slot may comprise one or more hinged doors or panels. In certain other embodiments the slot may comprise one or more sliding doors or panels. Certain embodiments may comprise both hinged and sliding doors or panels. The hinged and sliding doors may be water cooled, or cooled by other fluids.

In certain system and method embodiments, the submerged combustion melter may include one or more submerged combustion burners comprising one or more oxy-fuel combustion burners, such as described in assignee's U.S. Pat. No. 8,875,544.

In certain system and method embodiments the sources of oxidant and fuel may be one or more conduits, pipelines, storage facility, cylinders, or, in the case of oxidant, ambient air. Secondary and tertiary oxidants, if used may be supplied from a pipeline, cylinder, storage facility, cryogenic air separation unit, membrane permeation separator, or adsorption unit such as a vacuum swing adsorption unit. Certain embodiments may comprise using oxygen-enriched air as the primary oxidant, the fuel is a gaseous fuel, the gaseous fuel being selected from methane, natural gas, liquefied natural gas, propane, carbon monoxide, hydrogen, steam-reformed natural gas, atomized oil or mixtures thereof, and the oxygen-enriched air comprising at least 90 mole percent oxygen. In certain embodiments the oxygen may be injected into an intermediate mixture upstream of a combustion chamber of a burner, while in other embodiments the oxygen may be injected into the combustion chamber.

Certain system and process embodiments of this disclosure may be controlled by one or more controllers. For example, burner combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Certain systems and processes of this disclosure may also measure and/or monitor feed rate of batch or other feed materials, such as glass mat or wound roving, mass of glass mat or wound roving per unit length, web or roving linear speed, and combinations thereof, and use these measurements for control purposes. Exemplary systems and methods of the disclosure may comprise a combustion controller which receives one or more input parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, pressure of the oxidant entering the burner, humidity of the oxidant, burner geometry, oxidation ratio, temperature of the effluent and combinations thereof, and employs a control algorithm to control combustion temperature based on one or more of these input parameters.

Certain system and method embodiments may comprise using vibration and/or oscillation of the submerged combustion melter to predict melt viscosity and/or other properties of the initial foamy melt emanating from the melter, as disclosed in assignee's U.S. patent application Ser. No. 13/268,065 filed Oct. 7, 2011, now issued U.S. Pat. No. 8,973,400 issued Mar. 10, 2015.

Certain other systems and methods may comprise using a submerged combustion melter comprising a large diameter exhaust port connecting to a large diameter chamber positioned between the melting chamber and an exhaust stack, as disclosed in assignee's co-pending U.S. Pat. No. 8,707,740. Certain melters of this type may be devoid of a sump.

Yet other systems and methods may employ a lance above the foamy melt in the submerged combustion melter, as described in assignee's U.S. patent application Ser. No. 13/268,130 filed Oct. 7 2011, now issued U.S. Pat. No. 9,021,838 issued May 5, 2015.

Figure 6:
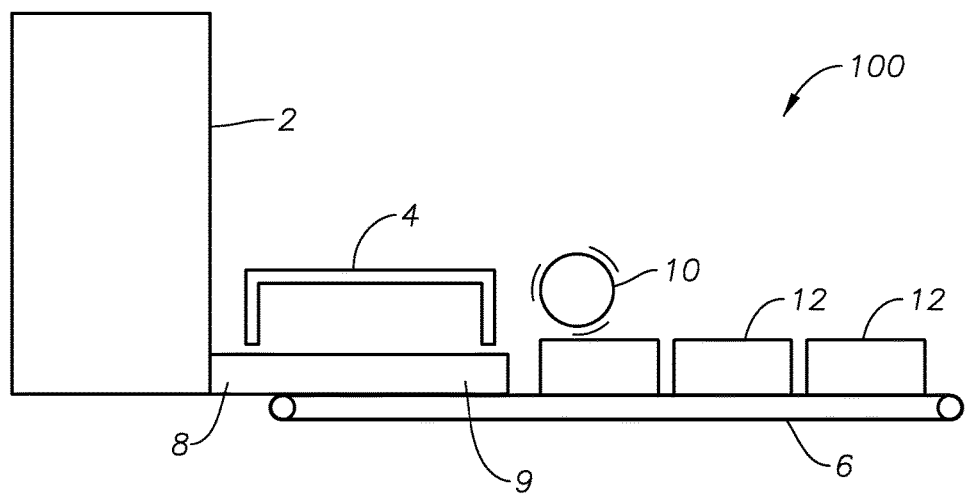
FIGS. 6-8 illustrate schematic side elevation views of three system embodiments of the present disclosure.

Specific non-limiting system and method embodiments in accordance with the present disclosure will now be presented in conjunction with FIGS. 6-12. The same numerals are used for the same or similar features in the various figures. In the views illustrated in FIGS. 6, 7 and 8, it will be understood in each case that the figures are schematic in nature, and certain conventional features are not illustrated in order to illustrate more clearly the key features of each embodiment. FIG. 6 illustrates a schematic side elevation view of a first system embodiment 100 comprising an SCM melter 2, an optional cooling and annealing lehr 4 downstream of melter 2, and a conveyor 6. An initial foamy molten glass 8 is discharged directly from the melter 2 to conveyer 6 in this embodiment. Initial foamy molten glass 8 discharged directly from melter 2 may be characterized as having small bubble diameters as measured and noted in Tables 1 and 2A and B and FIGS. 2-5. This initial foamy glass 8 would, if unmodified, produce a glass product with substantially uniformly distributed small bubbles. In system 100, however, initial foamy glass 8 from melter 2 discharges directly into or onto a moving apparatus, in this embodiment conveyor 6, that forms a continuous ribbon of foamed glass 9 of varying thickness and width which forms the initial product. Ribbon 9 of foamed glass may or may not pass through cooling and annealing lehr 4 to cool in a controlled manner ribbon 9, keeping ribbon 9 intact. Ribbon 9 is cut into the desired sizes by cutting equipment 10 to form panels or other shapes as the final foamed glass product 12.

The speed of conveyor 6 will largely control void fraction of the initial foamy glass, and optional lehr 4 may be used to provide controlled cooling and annealing. Lehrs may include roof burners, side burners, electric heating, and the like as are known in the art. Conveyors and lehrs may be obtained from commercial sources. Suitable lehrs (if present) and conveyors may have any shape (straight, L-shaped, curved, for example S-shaped), and may have one or more parallel and/or series arranged regions. Conveyors may comprise stainless steel mesh belts and support wheels or equivalent heat-resistant metal or ceramic components.

Figure 7:
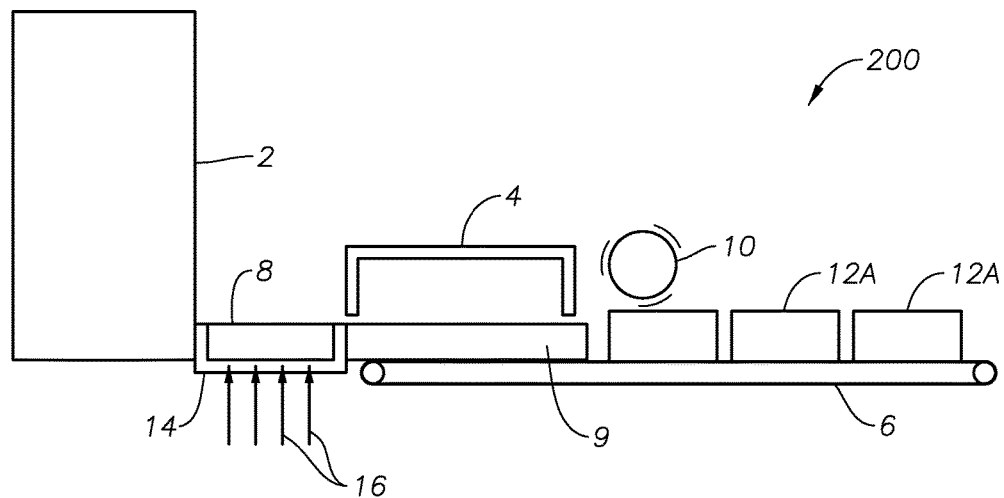

FIG. 7 illustrates a second non-limiting system embodiment 200 in accordance with the present disclosure. In embodiment 200, initial foamy molten glass 8 from one or more submerged combustion melters 2 is discharged into one or more refractory or refractory-lined channels 14 where the bubble size in the molten glass is increased through means of additional air or other gaseous injection through one or more gas injectors 16, four being illustrated in this embodiment, to form a lower density, foamy molten glass 8 through increased bubble size, and to control product density, bubble size, and gases contained within the bubbles. This lower density glass will be discharged, as in embodiment 100, onto a conveyor 6 and optionally through a cooling and annealing lehr 4 for thermal treatment and subsequent shaping into final products 12A of various shapes, for example by cutting equipment 10.

Flow rates and composition of injected gas will depend upon the desired final foamed glass product density, and the flow rate of molten glass, but generally the flow rate of gas will range from 0 to about 0.1 scf/lb. (0 to about 6250 $cm^3$/kg) of molten glass product/injector, or from 0 to about 0.03 scf/lb. (0 to about 1875 $cm^3$/kg) of molten glass product/injector. The number of and position of gas injectors 16 may vary, with lower number of injectors generally meaning their diameter would increase to deliver an equivalent amount of gas. Some of the injectors may be floor (bottom) mounted while some may be side-wall mounted, or all may be floor-mounted or all may be side-wall mounted. Gas injectors 16 may be positioned uniformly or non-uniformly. Flow of gas may be pulsed or non-pulsed. The flow rate of molten glass though channel 14 will in turn depend on the dimensions of channel 14, size of melter 2, temperature of the melt, viscosity of the melt, and like parameters, but in general the flow rate of molten glass in channel 14 may range from about 0.5 lb/min to over 5000 lbs/min (from about 0.23 kg/min to over 2300 kg/min), or from about 10 lbs/min to about 500 lbs/min (from about 4.5 kg/min to about 227 kg/min), or from about 100 lbs/min to 300 lbs/min (from about 45 kg/min to about 135 kg/min).

Temperature of the injected gas is not critical, but higher temperature gases may increase the ability of the gas to disperse in the foamy molten glass and cause less heat loss in the system, while cooler gases may require that the melter and possibly the lehr use more energy in the melting and annealing steps. In certain embodiments the injected gas may actually be used to control cooling of the foamy molten glass.

Pressure of the injected gases is also not critical, except that the pressure at the tip of the gas injectors need be higher than the local pressure of the foamy molten glass in channel 14. Too high gas injection pressures may cause unnecessary and undesired "belching" of the foamy molten glass, while too low gas injection pressure may cause the gas to be held up by the foamy molten glass, or not enter the foamy molten glass in channel 14. In worse cases the foamy molten glass might enter the gas injectors, which is undesired.

Gas injectors 16 may simply be open-ended pipes protruding through the bottom, the sides, or both of channel 14, or may be specifically designed injectors, such as pipe-in-pipe designs having water-cooled injection tubes, nozzles, and the like. The injectors themselves may be straight, angled, or curved conduits, and they may inject gas perpendicular to the bottom or sidewalls of channel 14, or may inject gas at an angle to the bottom and/or sidewalls.

Channel 14 and gas injectors 16 may be made from stainless steel, ceramic material (for example zirconia and the like), or other heat-resistant material, and combinations thereof (for example ceramic inserts in stainless steel tubes). Channel 14 may have any lateral shape, such rectangular, oval, round, and the like. Depth of channel 14 may vary, but exemplary embodiments may have a depth that is commensurate with melter 2 depth, and such that the foamy molten glass will be able to move onto conveyor 6 (and into lehr 4, if present), as in embodiment 100.

Figure 8:
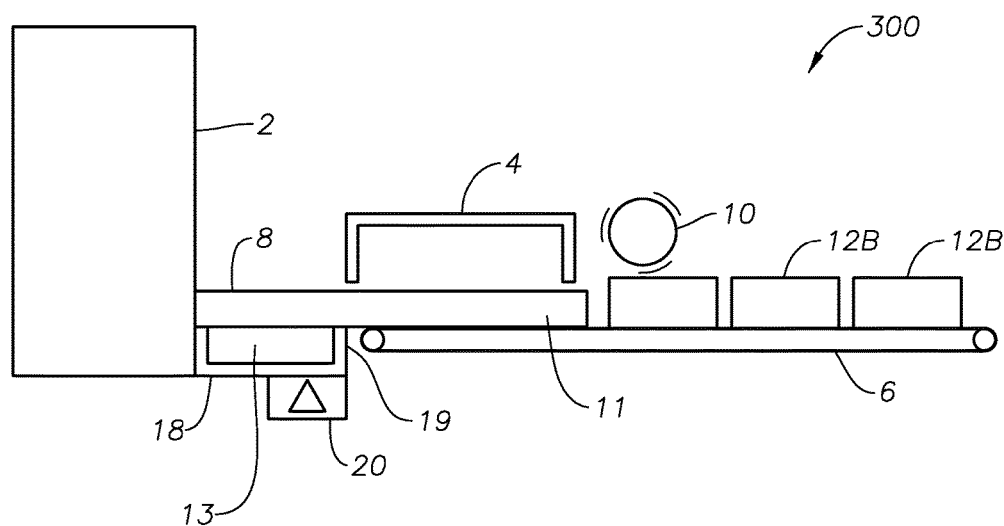

Another non-limiting system embodiment 300 is illustrated schematically in FIG. 8. In embodiment 300, initial foamy molten glass 8 from one or more submerged combustion melters 2 will be discharged into one or more refractory or refractory-lined channels 18 where bubbles in initial foamy molten glass 8 are allowed to coalesce and increase in size making larger voids and a lower density foamy glass 11. Refractory or refractory-lined channel 18 that receives initial foamy molten glass 8 from melter 2 allows initial foamy molten glass 8 to traverse through channel 18 to conveyor 6, and optionally to a lehr 4 inlet. Refractory or refractory-lined channel 18 is configured having a width and a depth for forming a zonal flow comprising a generally less dense upper flow 11 of foamy molten glass having generally decreasing density measured in a direction generally away from melter 2 outlet, and a generally denser lower flow 13 of molten glass having generally increasing density measured generally away from melter 2 outlet, the densities compared to the density of initial foamy glass 8. Optionally, a weir 19 may be provided over which the generally less dense upper flow 11 of foamy molten glass flows. The bubbles in initial foamy glass 8 rise as they coalesce leaving a denser and substantially bubble free glass 13 toward the lower portions (depths) of channel 18 and a throat or outlet 20 positioned near or at bottom of channel 18. In this embodiment, at least two different glass products can be made. By skimming off the low density, large bubble containing upper layer of glass from the channel, low density insulating panels 12B can be produced in the same pouring and shaping process as described in embodiments 100 and 200. In addition, the denser, bubble free glass in the lower depths of channel 18 may be delivered through throat 20 to dense glass processes, such as continuous filament glass fiber production, discontinuous filament glass fiber production, or other dense glass processes requiring well fined glass of specific properties and shapes.

Channel 18, optional weir 19, and throat 20 may be made from stainless steel, ceramic material (for example zirconia and the like), or other heat-resistant material, and combinations thereof (for example ceramic inserts in stainless bodies). Channel 18 may have any lateral shape, such rectangular, oval, round, and the like. Depth of channel 18 may vary, but exemplary embodiments may have a depth that is commensurate with melter 2 depth, and such that the upper flow of foamy molten glass 11 will be able to move onto conveyor 6 and optionally into lehr 4, as in embodiments 100 and 200.

Channels 14 and 18 may have a wide variety of cross-sectional shapes, and the cross-sectional shape may be the same or different along the length of the channels. The cross-section may be rectangular, round, oval, V-shaped, U-shaped, and the like. In embodiments 200 and 300, channels 14 and 18, respectively, are schematically illustrated as rectangular in cross-section with generally horizontal bottoms or floors, but this is not required.

The flow rates of the generally less dense and the generally denser molten glasses through channel 18 will in turn depend on the dimensions of channel 18, size of melter 2, whether or not there is a weir 19 or like device (such as a skimmer hanging from a roof of channel 18), temperature of the melts, viscosity of the melts, and like parameters, but in general the flow rates of less dense and denser molten glasses in channel 18 may each range from about 0.5 lb./min to over 5000 lb./min (from about 0.23 kg/min to over 2300 kg/min), or from about 10 lb./min to about 500 lb./min (from about 4.5 kg/min to about 227 kg/min), or from about 100 lb./min to 300 lb./min (from about 45 kg/min to about 135 kg/min).

Figure 9:
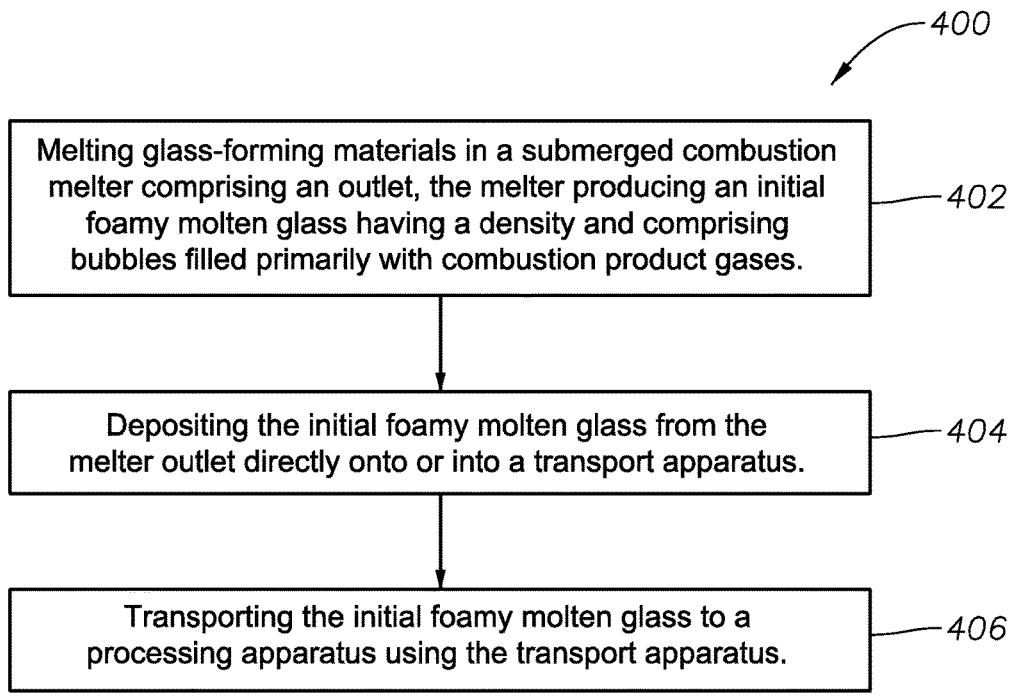
FIGS. 9-12 are logic diagrams of four method embodiments of the present disclosure.

FIGS. 9-12 are logic diagrams of four method embodiments of the present disclosure. FIG. 9 is a logic diagram of method embodiment 400, including the steps of melting glass-forming materials in a submerged combustion melter comprising an outlet, the melter producing an initial foamy molten glass having a density and comprising bubbles filled primarily with combustion product gases (box 402), depositing the initial foamy molten glass from the melter outlet directly onto or into a transport apparatus (box 404), and transporting the initial foamy molten glass to a processing apparatus using the transport apparatus (box 406).

Figure 10:
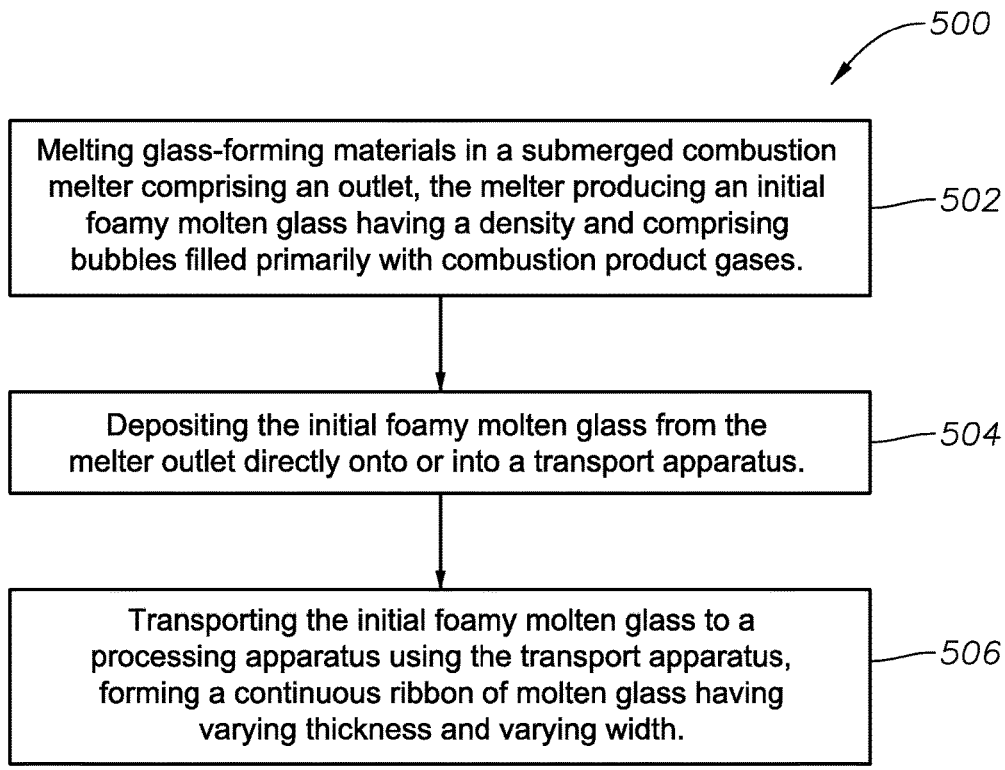

FIG. 10 is a logic diagram of method embodiment 500, which is a method of manufacturing foamed glass comprising the steps of melting glass-forming materials in a submerged combustion melter comprising an outlet, the melter producing an initial foamy molten glass having a density and comprising bubbles filled primarily with combustion product gases (box 502), depositing the initial foamy molten glass from the melter outlet directly onto or into a transport apparatus (box 504), and transporting the initial foamy molten glass to a processing apparatus using the transport apparatus, forming a continuous ribbon of molten foamed glass on or in the transport apparatus having varying thickness and varying width (box 506).

Figure 11:
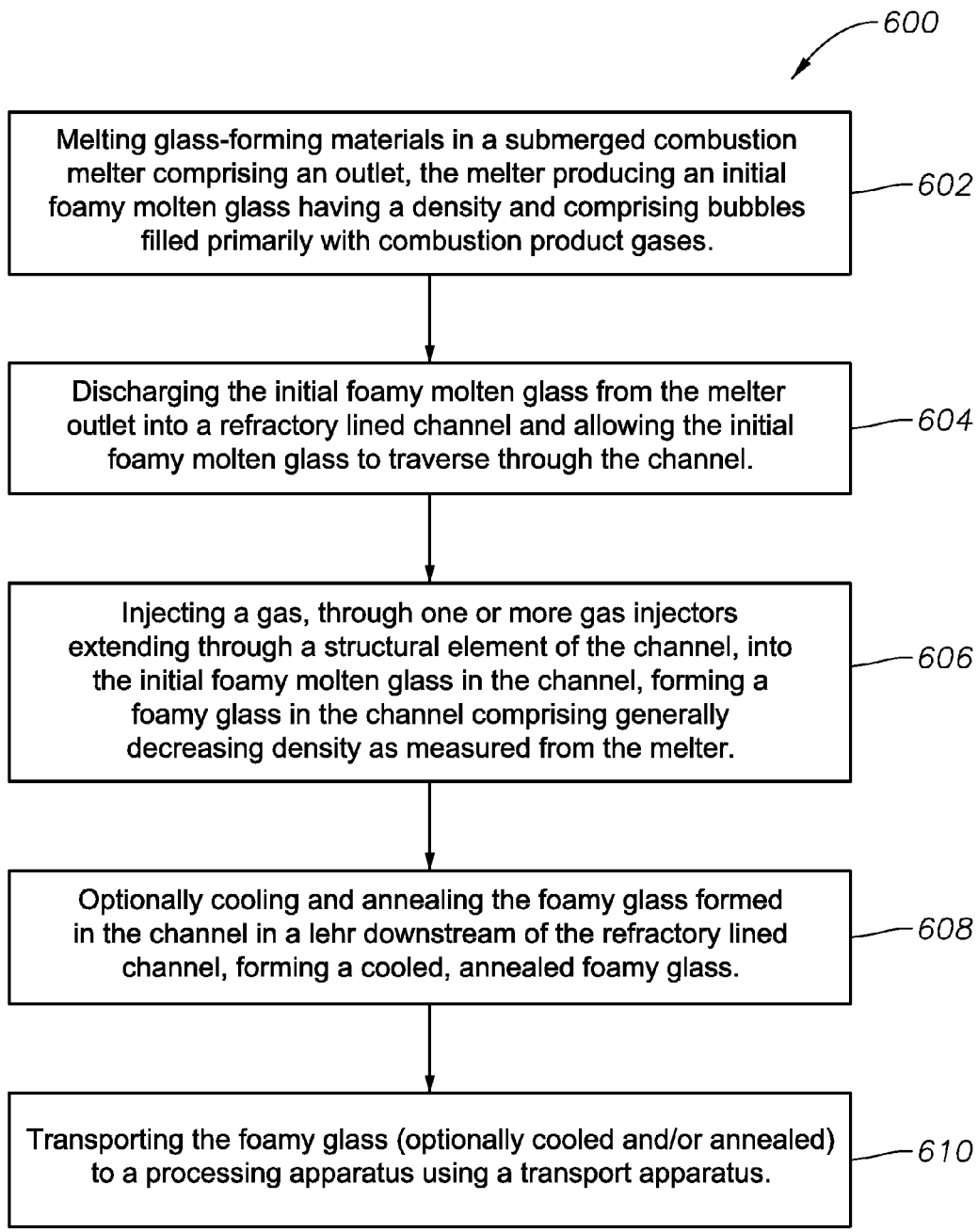

FIG. 11 is a logic diagram of method embodiment 600, which is a foamed glass manufacturing method comprising the steps of melting glass-forming materials in a submerged combustion melter comprising an outlet, the melter producing an initial foamy molten glass having a density and comprising bubbles filled primarily with combustion product gases (box 602); discharging the initial foamy molten glass from the melter outlet into a refractory or refractory-lined channel and allowing the initial foamy molten glass to traverse through the channel (box 604); injecting a gas, through one or more gas injectors extending through a structural element of the channel, into the initial foamy molten glass in the channel, forming a foamy glass in the channel comprising generally decreasing density as measured generally away from the melter outlet (box 606); optionally cooling and annealing the foamy glass formed in the channel in a lehr downstream of the refractory lined channel, forming a molten (optionally cooled and annealed) foamy glass (box 608), and transporting the molten foamy glass to a processing apparatus (box 610).

Figure 12:
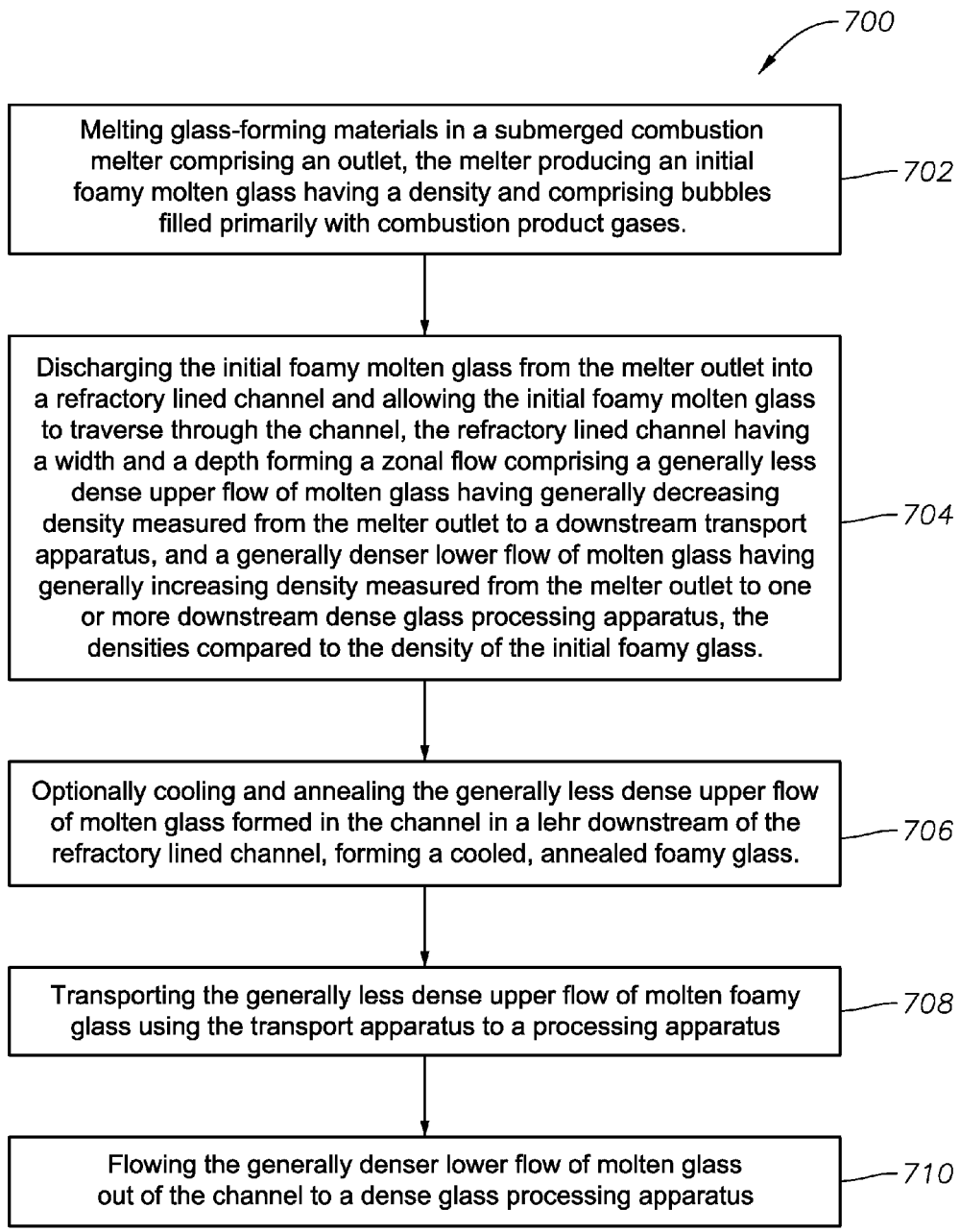

FIG. 12 is a logic diagram of method embodiment 700, which is a foamed glass manufacturing method comprising the steps of melting glass-forming materials in a submerged combustion melter comprising an outlet, the melter producing an initial foamy molten glass having a density and comprising bubbles filled primarily with combustion product gases (box 702); discharging the initial foamy molten glass from the melter outlet into a refractory or refractory-lined channel and allowing the initial foamy molten glass to traverse through the channel, the channel having a width and a depth forming a zonal flow comprising a generally less dense upper flow of molten glass having generally decreasing density measured generally away from the melter outlet, and a generally denser lower flow of molten glass having generally increasing density measured generally away from the melter outlet, the densities compared to the density of the initial foamy glass (box 704); optionally cooling and annealing the generally less dense upper flow of molten glass formed in the channel in a lehr downstream of the refractory lined channel, forming a molten (optionally cooled, annealed) foamy glass (box 706); transporting the generally less dense upper flow of molten foamy glass using the transport apparatus to a processing apparatus (box 708); and flowing the generally denser lower flow of molten glass out of the channel (box 710) to a dense glass processing apparatus.

Submerged combustion melter 2 in embodiments described herein may be any of the currently known submerged combustion melter designs as exemplified in the patent documents previously incorporated hereby reference in the Background of the present disclosure, or may be one of those described in assignee's U.S. Pat. No. 8,769,992, incorporated herein by reference. Submerged combustion melters useful in the practice of the methods and apparatus of this description may take any number of forms, including those described in assignee's U.S. Pat. No. 8,769,992, which describes sidewalls forming an expanding melting zone formed by a first trapezoidal region, and a narrowing melting zone formed by a second trapezoidal region, wherein a common base between the trapezoid defines the location of the maximum width of the melter. Submerged combustion melter 2 may include a roof, side walls, a floor or bottom, one or more submerged combustion burners, an exhaust chute, one or more molten glass outlets (only one being illustrated), and optionally fluid-cooled panels comprising some or all of the side walls. Submerged combustion melter 2 is typically supported on a plant floor. More specifically, in certain embodiments the '992 patent describes submerged combustion melter apparatus comprising a floor and a ceiling, and a substantially vertical wall connecting the floor and ceiling at a perimeter of the floor and ceiling. The melting zone is defined by the floor, ceiling and wall, the melting zone having a feed inlet configured to receive at least one partially vitrifiable material through a batch feed chute and a molten glass outlet positioned at opposing ends of the melting zone. The melting zone comprises an expanding zone beginning at the inlet and extending to an intermediate location relative to the opposing ends, and a narrowing zone extending from the intermediate location to the outlet, and wherein the melting zone has a plan view shape defined by first and second trapezoids sharing a common base positioned at the intermediate location and substantially perpendicular to a longitudinal axis of the melter. The first trapezoid has a side parallel to the base and positioned at the inlet, while the second trapezoid has a side parallel to the base and positioned at the outlet. A plurality of submerged burners may be provided at least some of which are positioned to direct combustion products into the expanding zone and the narrowing zone of the melting zone under a level of molten glass in the expanding zone and the narrowing zone. The '992 patent also describes submerged combustion melter apparatus embodiments comprising a floor and a ceiling, and a substantially vertical wall connecting the floor and ceiling at a perimeter of the floor and ceiling, with a melting zone that is non-symmetrical in plan about an axis substantially perpendicular to a longitudinal axis of the melter. In these embodiments, the melting zone is defined by the floor, ceiling and wall, the melting zone having a feed inlet configured to receive at least one partially vitrifiable material through a batch feed chute and a molten glass outlet positioned at opposing ends of the melting zone, the melting zone comprising an expanding zone beginning at the inlet and extending to an intermediate location relative to the opposing ends, and a narrowing zone extending from the intermediate location to the outlet. A plurality of submerged combustion burners may be provided, at least some of which are positioned to direct combustion products into the expanding zone and the narrowing zone of the melting zone under a level of molten glass in the expanding zone and the narrowing zone, wherein the wall in the expanding zone and the narrowing zone is non-linear.

Submerged combustion melter 2 may be fed a variety of feed materials by one or more roll stands, which in turn supports one or more rolls of glass mat, as described in assignee's U.S. Pat. No. 8,650,914, incorporated herein by reference. In certain embodiments powered nip rolls may include cutting knives or other cutting components to cut or chop the mat (or roving, in those embodiments processing roving) into smaller length pieces prior to entering melter 2. Also provided in certain embodiments is a glass batch feeder. Glass batch feeders are well-known in this art and require no further explanation. Certain embodiments may comprise a process control scheme for the submerged combustion melter and burners. For example, as explained in the U.S. Pat. No. 8,650,914, a master process controller may be configured to provide any number of control logics, including feedback control, feed-forward control, cascade control, and the like. The disclosure is not limited to a single master process controller, as any combination of controllers could be used. The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to burner control elements, and/or to local devices associated with burner control elements and glass mat feeding devices able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules. The controller may utilize Model Predictive Control (MPC) or other advanced multivariable control methods used in multiple input/multiple output (MIMO) systems. As mentioned previously, the methods of assignee's application Ser. No. 13/268,065 filed Oct. 7, 2011, now issued U.S. Pat. No. 8,973,400, issued Mar. 10, 2015, using the vibrations and oscillations of the melter itself, may prove useful predictive control inputs.

Those having ordinary skill in this art will appreciate that there are many possible variations of the melter, channels, lehrs, burners, and transport components described herein, and will be able to devise alternatives and improvements to those described herein that are nevertheless considered to be within the claims of the present patent.

Burners useful in the melter apparatus described herein include those described in U.S. Pat. Nos. 4,539,034; 3,170,781; 3,237,929; 3,260,587; 3,606,825; 3,627,504; 3,738,792; 3,764,287; and 7,273,583, and assignee's U.S. Pat. No. 8,875,544. One useful burner, for example, is described in the 583 patent as comprising a method and apparatus providing heat energy to a bath of molten material and simultaneously creating a well-mixed molten material. The burner functions by firing a burning gaseous or liquid fuel-oxidant mixture into a volume of molten material. The burners described in the 583 patent provide a stable flame at the point of injection of the fuel-oxidant mixture into the melt to prevent the formation of frozen melt downstream as well as to prevent any resultant explosive combustion; constant, reliable, and rapid ignition of the fuel-oxidant mixture such that the mixture burns quickly inside the molten material and releases the heat of combustion into the melt; and completion of the combustion process in bubbles rising to the surface of the melt. In one embodiment, the burners described in the 583 patent comprises an inner fluid supply tube having a first fluid inlet end and a first fluid outlet end and an outer fluid supply tube having a second fluid inlet end and a second fluid outlet end coaxially disposed around the inner fluid supply tube and forming an annular space between the inner fluid supply tube and the outer fluid supply tube. A burner nozzle is connected to the first fluid outlet end of the inner fluid supply tube. The outer fluid supply tube is arranged such that the second fluid outlet end extends beyond the first fluid outlet end, creating, in effect, a combustion space or chamber bounded by the outlet to the burner nozzle and the extended portion of the outer fluid supply tube. The burner nozzle is sized with an outside diameter corresponding to the inside diameter of the outer fluid supply tube and forms a centralized opening in fluid communication with the inner fluid supply tube and at least one peripheral longitudinally oriented opening in fluid communication with the annular space between the inner and outer fluid supply tubes. In certain embodiments, a longitudinally adjustable rod is disposed within the inner fluid supply tube having one end proximate the first fluid outlet end. As the adjustable rod is moved within the inner fluid supply tube, the flow characteristics of fluid through the inner fluid supply tube are modified. A cylindrical flame stabilizer element is attached to the second fluid outlet end. The stable flame is achieved by supplying oxidant to the combustion chamber through one or more of the openings located on the periphery of the burner nozzle, supplying fuel through the centralized opening of the burner nozzle, and controlling the development of a self-controlled flow disturbance zone by freezing melt on the top of the cylindrical flame stabilizer element. The location of the injection point for the fuel-oxidant mixture below the surface of the melting material enhances mixing of the components being melted and increases homogeneity of the melt. Thermal $NO_x$ emissions are greatly reduced due to the lower flame temperatures resulting from the melt-quenched flame and further due to insulation of the high temperature flame from the atmosphere.

In certain embodiments the burners may be floor-mounted burners. In certain embodiments, the burners may be positioned in rows substantially perpendicular to the longitudinal axis (in the melt flow direction) of melter 2. In certain embodiments, the burners may be positioned to emit combustion products into molten glass in a melting zone of melter 2 in a fashion so that the gases penetrate the melt generally perpendicularly to the floor. In other embodiments, one or more burners may emit combustion products into the melt at an angle to the floor, as taught in assignee's U.S. Pat. No. 8,769,992.

Submerged combustion melters useful in systems and methods in accordance with the present disclosure may also comprise one or more wall-mounted submerged combustion burners, and/or one or more roof-mounted burners. Roof-mounted burners may be useful to pre-heat the melter apparatus melting zone, and serve as ignition sources for one or more submerged combustion burners. Melters having only wall-mounted, submerged-combustion burners are also considered within the present disclosure. Roof-mounted burners may be oxy-fuel burners, but as they are only used in certain situations, are more likely to be air/fuel burners. Most often they would be shut-off after pre-heating the melter and/or after starting one or more submerged combustion burners. In certain embodiments, if there is a possibility of carryover of particles to the exhaust, one or more roof-mounted burners could be used to form a curtain to prevent particulate carryover. In certain embodiments, all submerged combustion burners are oxy/fuel burners (where "oxy" means oxygen, or oxygen-enriched air, as described earlier), but this is not necessarily so in all embodiments; some or all of the submerged combustion burners may be air/fuel burners. Furthermore, heating may be supplemented by electrical heating in certain melter embodiments, in certain melter zones, and in the lehr. In certain embodiments the oxy-fuel burners may comprise one or more submerged combustion burners each having co-axial fuel and oxidant tubes forming an annular space therebetween, wherein the outer tube extends beyond the end of the inner tube, as taught in U.S. Pat. No. 7,273,583, incorporated herein by reference. Burners may be flush-mounted with the melter floor in certain embodiments. In other embodiments, such as disclosed in the '583 patent, a portion of one or more of the burners may extend slightly into the melt above the melter floor.

In certain embodiments, melter side walls may have a free-flowing form, devoid of angles. In certain other embodiments, side walls may be configured so that an intermediate location may comprise an intermediate region of melter 2 having constant width, extending from a first trapezoidal region to the beginning of a narrowing melting region. Other embodiments of suitable melters are described in the above-mentioned U.S. Pat. No. 8,769,992 .

As mentioned herein, useful melters may include refractory fluid-cooled panels. Liquid-cooled panels may be used, having one or more conduits or tubing therein, supplied with liquid through one conduit, with another conduit discharging warmed liquid, routing heat transferred from inside the melter to the liquid away from the melter. Liquid-cooled panels may also include a thin refractory liner, which minimizes heat losses from the melter, but allows formation of a thin frozen glass shell to form on the surfaces and prevent any refractory wear and associated glass contamination. Other useful cooled panels include air-cooled panels, comprising a conduit that has a first, small diameter section, and a large diameter section. Warmed air transverses the conduits such that the conduit having the larger diameter accommodates expansion of the air as it is warmed. Air-cooled panels are described more fully in U.S. Pat. No. 6,244,197. In certain embodiments, the refractory fluid cooled-panels are cooled by a heat transfer fluid selected from the group consisting of gaseous, liquid, or combinations of gaseous and liquid compositions that functions or is capable of being modified to function as a heat transfer fluid. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids which may be organic, inorganic, or some combination thereof, for example, salt solutions, glycol solutions, oils and the like. Other possible heat transfer fluids include steam (if cooler than the oxygen manifold temperature), carbon dioxide, or mixtures thereof with nitrogen. Heat transfer fluids may be compositions comprising both gas and liquid phases, such as the higher chlorofluorocarbons.

The refractory or refractory-lined channels described in accordance with the present disclosure may be constructed using refractory cooled panels. Both the melter and channel floors and side walls may include a thin refractory lining, as discussed herein. The thin refractory coating may be 1 centimeter, 2 centimeters, 3 centimeters or more in thickness, however, greater thickness may entail more expense without resultant greater benefit. The refractory lining may be one or multiple layers. Alternatively, melters and channels described herein may be constructed using cast concretes such as disclosed in U.S. Pat. No. 4,323,718. The thin refractory linings discussed herein may comprise materials described in the 718 patent. Two cast concrete layers are described in the 718 patent, the first being a hydraulically setting insulating composition (for example, that known under the trade designation CASTABLE BLOC-MIX-G, a product of Fleischmann Company, Frankfurt/Main, Federal Republic of Germany). This composition may be poured in a form of a wall section of desired thickness, for example a layer 5 cm thick, or 10 cm, or greater. This material is allowed to set, followed by a second layer of a hydraulically setting refractory casting composition (such as that known under the trade designation RAPID BLOCK RG 158, a product of Fleischmann company, Frankfurt/Main, Federal Republic of Germany) may be applied thereonto. Other suitable materials for the refractory cooled panels, melter and channel refractory liners, and refractory block burners (if used) are fused zirconia ($ZrO_2$), fused cast AZS (alumina-zirconia-silica), rebonded AZS, or fused cast alumina ($Al_2O_3$). The choice of a particular material is dictated among other parameters by the melter geometry and type of glass to be produced.

The term "fuel", according to this disclosure, means a combustible composition comprising a major portion of, for example, methane, natural gas, liquefied natural gas, propane, atomized oil or the like (either in gaseous or liquid form). Fuels useful in the disclosure may comprise minor amounts of particulate fuels, and minor amounts of non-fuels therein, including oxidants, for purposes such as pre-mixing the fuel with the oxidant, or atomizing liquid fuels.

The total quantities of fuel and oxidant used by the combustion system may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2. In certain embodiments, the equivalent fuel content of the feed material must be taken into account. For example, organic binders in glass fiber mat scrap materials will increase the oxidant requirement above that required strictly for fuel being combusted. In consideration of these embodiments, the combustion ratio may be increased above 1.2, for example to 1.5, or to 2, or 2.5, or even higher, depending on the organic content of the feed materials.

The velocity of the fuel gas in the various burners depends on the burner geometry used, but generally is at least about 15 m/s. The upper limit of fuel velocity depends primarily on the desired mixing of the melt in the melter apparatus, melter geometry, and the geometry of the burner; if the fuel velocity is too low, the flame temperature may be too low, providing inadequate melting, which is not desired, and if the fuel flow is too high, flame might impinge on the melter floor, roof or wall, and/or heat will be wasted, which is also not desired.

Although only a few exemplary embodiments of this disclosure have been described in detail above, those skilled in the art will readily appreciate that many modifications are possible in the exemplary embodiments without materially departing from the novel apparatus and processes described herein. Accordingly, all such modifications are intended to be included within the scope of this disclosure as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A method comprising:
    melting glass-forming materials in a submerged combustion melter comprising an outlet, the melter producing an initial foamy molten glass having a density and comprising bubbles filled primarily with combustion product gases,
    depositing the initial foamy molten glass from the melter outlet directly onto a conveyor, and
    transporting the initial foamy molten glass to a processing apparatus using the conveyor, forming a continuous ribbon of molten foamed glass having varying thickness and varying width as the ribbon passes over the conveyor.

2. The method of claim 1 comprising controllably cooling and/or annealing the initial foamy molten glass during at least a portion of the transporting step.

3. The method of claim 1 comprising the conveyor transporting the glass through a lehr at a controlled speed, the lehr divided into different areas each with its own heat source, and regulating a temperature gradient to which the glass is submitted in the lehr.

4. The method of claim 1 comprising the conveyor allowing the continuous ribbon thickness to generally decrease as the ribbon passes over the conveyor.

5. The method of claim 1 comprising the conveyor allowing the continuous ribbon width to generally increase as the ribbon passes over the conveyor.

6. The method of claim 1 comprising discharging the initial foamy molten glass into a stage intermediate the melter outlet and the conveyor, the intermediate stage i) receiving the initial foamy molten glass directly from the melter outlet; and ii) transforming the initial foamy molten glass into an initial product composition that comprises less uniformly distributed bubbles than the initial foamy molten glass.

7. The method of claim 6 wherein the discharging the initial foamy molten glass into the intermediate stage comprises discharging the initial foamy molten glass into a refractory or refractory-lined channel, the channel receiving the initial foamy molten glass from the melter outlet and allowing the initial foamy molten glass to traverse through channel to the conveyor.

8. The method of claim 7 comprising injecting a gas, through one or more gas injectors extending through a structural element of the channel, into the initial foamy molten glass in the channel, forming a foamy glass in the channel comprising generally decreasing density as measured from the melter outlet to the conveyor.

9. The method of claim 8 wherein the injecting a gas comprises delivering the gas through a bottom of the channel.

10. The method of claim 7 wherein the discharging of the initial foam molten glass into the channel comprises forming a zonal flow comprising a generally less dense upper flow of molten glass having generally decreasing density measured in a direction generally away from the melter outlet, and a generally denser lower flow of molten glass having generally increasing density measured in a direction generally away from the melter outlet, the densities compared to the density of the initial foamy glass.

11. The method of claim 10 comprising flowing the generally less dense upper flow of molten glass over a weir, the weir positioned just upstream of the conveyor, and flowing the generally denser lower flow of molten glass out of the channel through an outlet.

12. The method of claim 1 comprising the processing apparatus producing a foamed glass product having reduced odor compared to a foamed glass product made using a non-submerged combustion batch melting process.

13. A method of manufacturing foamed glass comprising:
    melting glass-forming materials in a submerged combustion melter comprising an outlet, the melter producing an initial foamy molten glass having a density and comprising bubbles filled primarily with combustion product gases,
    depositing the initial foamy molten glass from the melter outlet directly onto or into a transport apparatus, and
    transporting the initial foamy molten glass to a processing apparatus using the transport apparatus, forming a continuous ribbon of molten foamed glass on or in the transport apparatus having varying thickness and varying width, allowing the thickness of the continuous ribbon to generally decrease as it flows in a direction generally away from the melter outlet, and allowing the width of the continuous ribbon to generally increase as it flows in a direction generally away from the melter outlet.

14. A foamed glass manufacturing method comprising:
    melting glass-forming materials in a submerged combustion melter comprising an outlet, the melter producing an initial foamy molten glass having a density and comprising bubbles filled primarily with combustion product gases,
    discharging the initial foamy molten glass from the melter outlet into a refractory or refractory-lined channel and allowing the initial foamy molten glass to traverse through the channel,
    injecting a gas, through one or more gas injectors extending through a structural element of the channel, into the initial foamy molten glass in the channel, forming a foamy glass in the channel comprising generally decreasing density as measured from the melter outlet, and
    transporting the foamy glass as a continuous ribbon of molten foamed glass having varying thickness and varying width to a processing apparatus using a transport apparatus.

15. A foamed glass manufacturing method comprising:
    melting glass-forming materials in a submerged combustion melter comprising an outlet, the melter producing an initial foamy molten glass having a density and comprising bubbles filled primarily with combustion product gases,
    discharging the initial foamy molten glass from the melter outlet into a refractory or refractory-lined channel and allowing the initial foamy molten glass to traverse through the channel, the channel having a width and a depth forming a zonal flow comprising a generally less dense upper flow of molten glass having generally decreasing density measured from the melter outlet to a downstream transport apparatus, and a generally denser lower flow of molten glass having generally increasing density measured from the melter outlet to one or more downstream dense glass processing apparatus, the densities compared to the density of the initial foamy glass, depositing the upper flow of molten glass onto or into the downstream transport apparatus, and allowing the generally denser lower flow of molten glass to flow out of the channel to the downstream dense glass processing apparatus.

16. The method of claim 15 comprising transporting the less dense foamy glass to a foamed glass product fabricating facility.

17. The method of claim 16 comprising using the foamed glass product fabricating facility to produce a foamed glass product having reduced odor compared to a foamed glass product made using a non-submerged combustion batch melting process.

18. The method of claim 15 wherein the downstream dense glass processing apparatus is selected from the group consisting of continuous fiber production apparatus, discontinuous fiber production apparatus, and dense glass shaping apparatus.

19. A method comprising:
melting glass-forming materials in a submerged combustion melter comprising an outlet, the melter producing an initial foamy molten glass having a density and comprising bubbles filled primarily with combustion product gases, depositing the initial foamy molten glass from the melter outlet directly onto a conveyor, transporting the initial foamy molten glass to a processing apparatus using the conveyor, forming a continuous ribbon of molten foamed glass having varying thickness and varying width as the ribbon passes over the conveyor, and controlling speed of the conveyor to control void fraction of the initial foamy glass.

20. The method of claim 19 comprising controllably cooling and/or annealing the initial foamy molten glass during at least a portion of the transporting step.

21. The method of claim 19 comprising the conveyor transporting the glass through a lehr at a controlled speed, the lehr divided into different areas each with its own heat source, and regulating a temperature gradient to which the glass is submitted in the lehr.

22. The method of claim 19 comprising the conveyor allowing the continuous ribbon thickness to generally decrease as the ribbon passes over the conveyor.

23. The method of claim 19 comprising the conveyor allowing the continuous ribbon width to generally increase as the ribbon passes over the conveyor.

24. The method of claim 19 comprising discharging the initial foamy molten glass into a stage intermediate the melter outlet and the conveyor, the intermediate stage i) receiving the initial foamy molten glass directly from the melter outlet; and ii) transforming the initial foamy molten glass into an initial product composition that comprises less uniformly distributed bubbles than the initial foamy molten glass.

25. The method of claim 24 wherein the discharging the initial foamy molten glass into the intermediate stage comprises discharging the initial foamy molten glass into a refractory or refractory-lined channel, the channel receiving the initial foamy molten glass from the melter outlet and allowing the initial foamy molten glass to traverse through channel to the conveyor.

26. The method of claim 25 comprising injecting a gas, through one or more gas injectors extending through a structural element of the channel, into the initial foamy molten glass in the channel, forming a foamy glass in the channel comprising generally decreasing density as measured from the melter outlet to the conveyor.

27. The method of claim 26 wherein the injecting a gas comprises delivering the gas through a bottom of the channel.

28. The method of claim 25 wherein the discharging of the initial foam molten glass into the channel comprises forming a zonal flow comprising a generally less dense upper flow of molten glass having generally decreasing density measured in a direction generally away from the melter outlet, and a generally denser lower flow of molten glass having generally increasing density measured in a direction generally away from the melter outlet, the densities compared to the density of the initial foamy glass.

29. The method of claim 28 comprising flowing the generally less dense upper flow of molten glass over a weir, the weir positioned just upstream of the conveyor, and flowing the generally denser lower flow of molten glass out of the channel through an outlet.

30. The method of claim 19 comprising the processing apparatus producing a foamed glass product having reduced odor compared to a foamed glass product made using a non-submerged combustion batch melting process.

31. A method of manufacturing foamed glass comprising:
melting glass-forming materials in a submerged combustion melter comprising an outlet, the melter producing an initial foamy molten glass having a density and comprising bubbles filled primarily with combustion product gases, depositing the initial foamy molten glass from the melter outlet directly onto or into a transport apparatus, transporting the initial foamy molten glass to a processing apparatus using the transport apparatus, forming a continuous ribbon of molten foamed glass on or in the transport apparatus having varying thickness and varying width, allowing the thickness of the continuous ribbon to generally decrease as it flows in a direction generally away from the melter outlet, and allowing the width of the continuous ribbon to generally increase as it flows in a direction generally away from the melter outlet, and controlling speed of the transport apparatus to control void fraction of the initial foamy glass.

32. A foamed glass manufacturing method comprising:
melting glass-forming materials in a submerged combustion melter comprising an outlet, the melter producing an initial foamy molten glass having a density and comprising bubbles filled primarily with combustion product gases, discharging the initial foamy molten glass from the melter outlet into a refractory or refractory-lined channel and allowing the initial foamy molten glass to traverse through the channel, the channel having a width and a depth forming a zonal flow comprising a generally less dense upper flow of molten glass having generally decreasing density measured from the melter outlet to a downstream transport apparatus, and a generally denser lower flow of molten glass having generally increasing density measured from the melter outlet to one or more downstream dense glass processing apparatus, the densities compared to the density of the initial foamy glass, depositing the upper flow of molten glass onto or into the downstream transport apparatus, allowing the generally denser lower flow of molten glass to flow out of the channel to the downstream dense glass processing apparatus, and controlling speed of the downstream transport apparatus to control void fraction of the initial foamy glass.

33. The method of claim 32 comprising transporting the less dense foamy glass to a foamed glass product fabricating facility.

34. The method of claim 33 comprising the foamed glass product fabricating facility producing a foamed glass product having reduced odor compared to a foamed glass product made using a non-submerged combustion batch melting process.

35. The method of claim 32 wherein the downstream dense glass processing apparatus is selected from the group consisting of continuous fiber production apparatus, discontinuous fiber production apparatus, and dense glass shaping apparatus.

* * * * *